(12) United States Patent
Murakami et al.

(10) Patent No.: US 9,886,403 B2
(45) Date of Patent: Feb. 6, 2018

(54) CONTENT OUTPUT DEVICE FOR OUTPUTTING CONTENT

(71) Applicant: CASIO COMPUTER CO., LTD., Shibuya-ku, Tokyo (JP)

(72) Inventors: Bungo Murakami, Koganei-shi (JP); Hideo Suzuki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 235 days.

(21) Appl. No.: 14/662,200

(22) Filed: Mar. 18, 2015

(65) Prior Publication Data

US 2015/0286598 A1    Oct. 8, 2015

(30) Foreign Application Priority Data

Apr. 3, 2014 (JP) ................................ 2014-077062
Oct. 31, 2014 (JP) ................................ 2014-223152

(51) Int. Cl.
| | | |
|---|---|---|
| G06F 13/36 | (2006.01) | |
| G06F 13/362 | (2006.01) | |
| H04N 21/43 | (2011.01) | |
| H04N 21/4725 | (2011.01) | |
| H04N 21/81 | (2011.01) | |

(Continued)

(52) U.S. Cl.
CPC ..... *G06F 13/3625* (2013.01); *H04N 21/4307* (2013.01); *H04N 21/4725* (2013.01); *H04N 21/812* (2013.01); *H04N 21/8583* (2013.01); *H04N 21/8586* (2013.01);

(Continued)

(58) Field of Classification Search
None
See application file for complete search history.

(56) References Cited

U.S. PATENT DOCUMENTS 8,108,257 B2    1/2012  Sengamedu
8,310,443 B1   11/2012  Pan
(Continued)

FOREIGN PATENT DOCUMENTS

JP    2009528623 A    8/2009
JP    2010526497 A    7/2010
(Continued)

OTHER PUBLICATIONS

Japanese Office Action (and English translation thereof) dated Feb. 24, 2016, issued in counterpart Japanese Application No. 2014-077062.

(Continued)

*Primary Examiner* — Henry Tsai
*Assistant Examiner* — Aurangzeb Hassan
(74) *Attorney, Agent, or Firm* — Holtz Holtz & Volek PC

(57) ABSTRACT

In order to perform processing corresponding to an instruction or a reaction at appropriate timing when a predetermined instruction is given or a reaction by a user is made while content is being outputted, a CPU detects instruction timing when a predetermined user instruction is given for data outputted while pieces of data constituting content are being sequentially outputted; stores the detected instruction timing in an instruction information memory; specifies predetermined timing that comes later than the instruction timing stored in the instruction information memory as timing for performing processing in accordance with the user's instruction; and performs the processing.

9 Claims, 15 Drawing Sheets

(51) Int. Cl.
*H04N 21/858* (2011.01)
*G06F 13/28* (2006.01)
*G06F 13/40* (2006.01)

(52) U.S. Cl.
CPC .......... *G06F 13/28* (2013.01); *G06F 13/4022* (2013.01); *G06F 13/4027* (2013.01)

(56) References Cited

U.S. PATENT DOCUMENTS

| | | |
|---|---|---|
| 8,341,537 B2 | 12/2012 | Ray et al. |
| 8,429,531 B2 | 4/2013 | Inami et al. |
| 8,468,562 B2 | 6/2013 | Miller et al. |
| 9,137,552 B2 | 9/2015 | Miller et al. |
| 2007/0204239 A1* | 8/2007 | Ray .................... G06F 3/04812 715/856 |
| 2008/0276269 A1 | 11/2008 | Miller et al. |
| 2010/0079620 A1* | 4/2010 | Kuriyama .............. H04N 5/232 348/231.3 |
| 2011/0296307 A1 | 12/2011 | Inami et al. |
| 2013/0247096 A1 | 9/2013 | Miller et al. |
| 2013/0311908 A1 | 11/2013 | Ray et al. |
| 2014/0025860 A1* | 1/2014 | Hara ................... G06F 13/4022 710/316 |
| 2015/0350739 A1 | 3/2015 | Miller et al. |
| 2016/0275200 A1 | 9/2016 | Yamahara et al. |

FOREIGN PATENT DOCUMENTS

| | | |
|---|---|---|
| JP | 2013140542 A | 7/2013 |
| JP | 2013176103 A | 9/2013 |
| WO | 2007100693 A1 | 9/2007 |
| WO | 2010095195 A1 | 8/2010 |
| WO | 2015079527 A1 | 6/2015 |

OTHER PUBLICATIONS

Maruta, "Flesher hearty welcome consecutive projects New IT common senses 128 of businessman: The second Smartphone edition", Weekly ASCII, Japan, ASCII Media, Apr. 3, 2012, vol. 24 consecutive Number of vol. 876 issue, pp. 106.
Japanese Office Action dated Sep. 26, 2017 issued in counterpart Japanese Application No. 2016-101255.

* cited by examiner

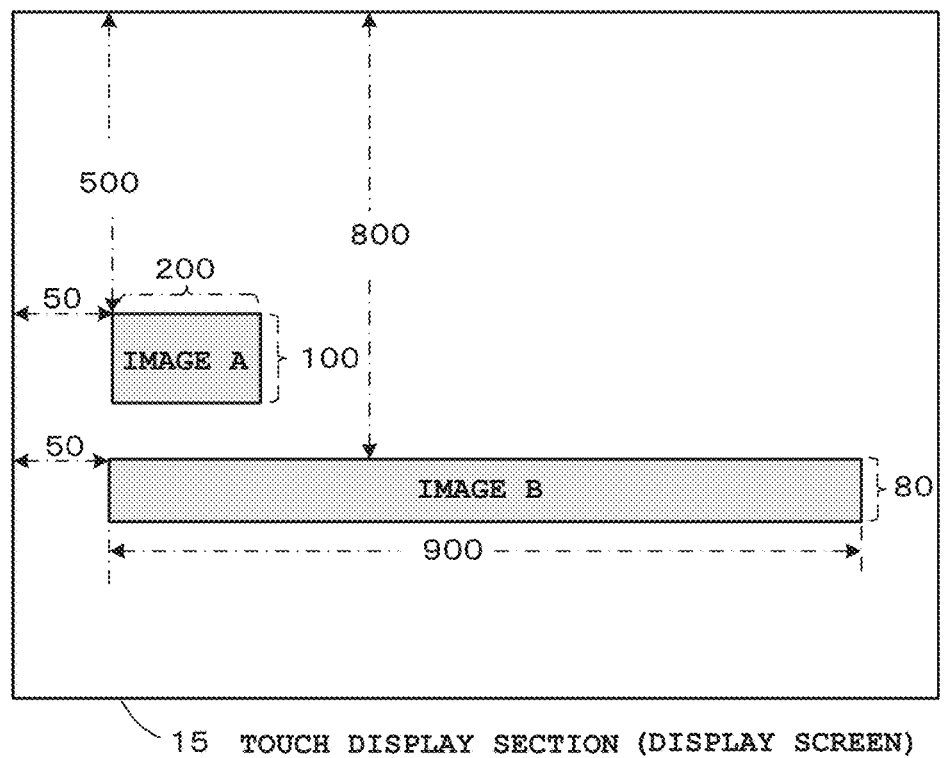

FIG. 4A
DURING READING
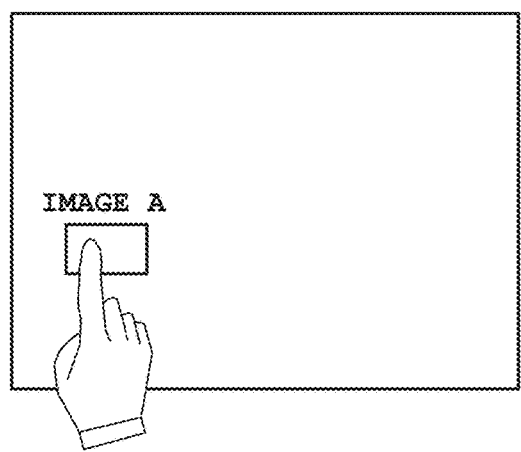
FIG. 4B
READ COMPLETE
(DISPLAY COMPLETE)
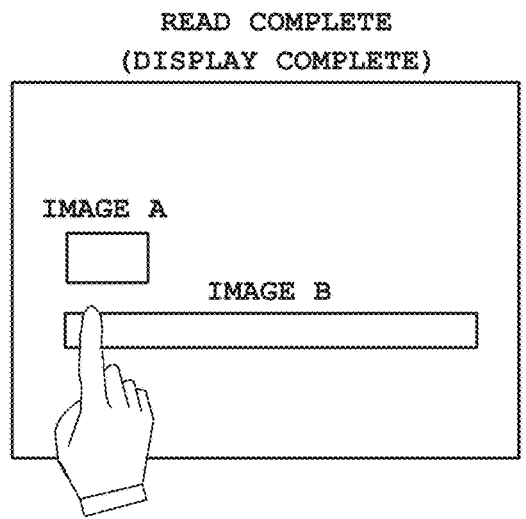
FIG. 4C
130d INSTRUCTION INFORMATION MEMORY
| INSTRUCTION NUMBER | INSTRUCTION TIMING | INSTRUCTION POSITION |
|---|---|---|
| 001 | 2013. 03. 26 09. 47. 51. 000 | 80×700 |
| ⋮ | ⋮ | ⋮ |

FIG. 9A

_13c OUTPUT INFORMATION MEMORY

| DATA NUMBER | DATA NAME | TIME STAMP AT DATA READING | LINK DESTINATION |
|---|---|---|---|
| 001 | IMAGE X1 | 2013. 03. 26 09. 47. 50. 000 | * * * |
| 002 | IMAGE X2 | 2013. 03. 26 09. 47. 55. 500 | * * * |
| ⋮ | ⋮ | ⋮ | ⋮ |

FIG. 9B

_13d REACTION INFORMATION MEMORY

| DATA NUMBER | REACTION TIMING |
|---|---|
| 001 | 2013. 03. 26 09. 47. 52. 000 |
| ⋮ | ⋮ |

CONTENT OUTPUT DEVICE FOR OUTPUTTING CONTENT

CROSS-REFERENCE TO RELATED APPLICATIONS

This application is based upon and claims the benefit of priority from the prior Japanese Patent Applications No. 2014-077062, filed Apr. 3, 2014 and No. 2014-223152, filed Oct. 31, 2014, the entire contents of which are incorporated herein by reference.

BACKGROUND OF THE INVENTION

1. Field of the Invention

The present invention relates to a content output device for outputting content of Web pages and advertisement data.

2. Description of the Related Art

In recent years, traffic on networks and the amount of information on websites have been increasing along with the prevalence of smartphones (multifunctional portable telephones) and the like. Accordingly, the loading times of web browsers required for users to view content by the web browsers are becoming an issue that cannot be ignored.

For example, when individual pieces of data (such as images) constituting content (Web page data) are to be arranged and displayed, the layout of the entire page is adjusted while the pieces of data are sequentially read out. Accordingly, in some cases, the position of data being viewed by a user is moved due to the reading and displaying of another new data.

In particular, when a user is to select a URL (Uniform Resource Locator) linked to another page so as to jump to this page while a Web site is being read out, if the timing of a click operation on the link and the timing of the arrangement of new data coincide with each other, a link destination not desired may be selected for transition.

When a jump is made to a wrong link destination as described above, the user is required to return to the original site, which causes a loss of time and mental stress. Moreover, even if a jump is correctly made to a desired link destination, the user may overlook or misidentify important data by the sudden data switching, or confuse content displayed right before the switching with the content of the link destination.

Conventionally, there is a technology in which, when a request to replay additional information is accepted while content (moving image data) is being displayed, the additional information is acquired and displayed from a link destination based on the time of day where the additional information is replayed (refer to Japanese Patent Application Laid-Open (Kokai) Publication No. 2013-140542).

Also, there is a technology in which, when hypervideo content is clicked, its link information is stored as a bookmark, and an action for the bookmark can be performed (refer to Japanese Patent Application Laid-Open (Kokai) Publication No. 2013-176103).

Moreover, there is a technology in which a graphical symbol is displayed which indicates that the display of additional content associated with a hyperlink is delayed for a predetermined period of time (refer to Japanese National Publication of International Patent Application No. 2009-528623).

In the technology disclosed in Japanese Patent Application Laid-Open (Kokai) Publication No. 2013-140542, current content can be switched to content matching with the scene of the content being replayed. However, when the user finds interesting data (link destination) during the playback of content and a user operation (playback request) is performed, a jump is made to that link destination, and the playback is interrupted, which causes the user to miss a portion where the user desires to view, and confuse content displayed right before the interruption with the content of the link destination. As such, in the playback of content (moving image data) as well, problems similar to the above-described problems in the viewing of a Web page occur.

Also, in the technology disclosed in Japanese Patent Application Laid-Open (Kokai) Publication No. 2013-176103, read processing is required in which the link information of content is read out from hypervideo by the content being clicked. This read processing increases a processing load, which may affect ongoing video playback processing.

Moreover, the technology disclosed in Japanese National Publication of International Patent Application No. 2009-528623 is merely a technology where a graphical symbol indicating delay can be displayed.

Advertisement output apparatuses, such as digital signage apparatuses called electronic signboards or electronic advertisement plates, can provide latest data by changing advertisement details as needed via a communication network or a storage medium, and can display moving image data. Therefore, advertisement output apparatuses have been widely available as advertisement media capable of heightening viewers' attention.

In the technology disclosed in Japanese Patent Application Laid-Open (Kokai) Publication No. 2013-140542, advertisement data is distributed to portable terminal devices via communication means or a two-dimensional code. However, this advertisement provided to the portable terminal devices does not always include content attractive to the customers. In addition, when the customer finds interesting data during the playback of data and performs a playback request operation, a jump is made to the data of that link destination, whereby the playback is interrupted, and the continuity of the storytelling is interrupted by the sudden data switching. Moreover, the customer may overlook or misidentify important data, or confuse advertisement content displayed right before the switching with the advertisement content of the link destination.

SUMMARY OF THE INVENTION

A first object of the present invention is to enable processing to be performed at appropriate timing in accordance with a user operation (such as click or reaction) during the output of content.

In order to achieve the above-described object, in accordance with one aspect of the present invention, there is provided a content output device for outputting content, comprising: an output control section which outputs output details in the content while sequentially changing the output details; a content storage section which stores each of the output details of the content in association with each output timing; a detection control section which detects, when an instruction is given at arbitrary timing by a user while the output details of the content are being sequentially changed and outputted, instruction timing of the instruction; a storage control section which causes the detected instruction timing to be stored in an instruction storage section in association with the content; a specification control section which judges whether the instruction timing has been stored in the instruction storage section at predetermined timing after a series of outputs of the output details of the content is completed, reads out the instruction timing stored in the instruction storage section when the instruction timing is judged to have been stored, and specifies an output detail of the content that has been outputted at point of the instruction timing; and a processing execution control section which performs processing corresponding to the specified output detail.

In accordance with another aspect of the present invention, there is provided a content output apparatus for outputting content, comprising: an output control section which outputs output details in the content while sequentially changing the output details; a content storage section which stores each of the output details of the content in association with each output timing; a detection control section which judges whether a reaction at arbitrary timing has been made by a user while the output details of the content are being sequentially changed and outputted, and detects reaction timing of the reaction when the reaction is judged to have been made; a storage control section which causes the detected reaction timing to be stored in a reaction storage section in association with the content; a specification control section which judges whether the reaction timing has been stored in the reaction storage section at predetermined timing after a series of outputs of the output details of the content is completed, reads out the reaction timing stored in the reaction storage section when the reaction timing is judged to have been stored, and specifies an output detail of the content that has been outputted at point of the reaction timing; and a processing execution control section which performs processing corresponding to the specified output detail.

According to the present invention, processing can be performed at appropriate timing in accordance with a user operation (such as click or reaction) during the output of content.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 3A and 3B are diagrams for describing an output information memory 130c;

FIGS. 4A, 4B, and 4C are diagrams for describing an instruction information memory 130d;

FIG. 9A is a diagram for describing the output information memory 13c;

FIG. 9B is a diagram for describing a reaction information memory 13d;

DETAILED DESCRIPTION OF THE PREFERRED EMBODIMENTS

Hereafter, embodiments of the present invention are described in detail with reference to the drawings.

First Embodiment

First, a first embodiment of the present invention is described with reference to FIG. 1 to FIG. 6.

Figure 1:
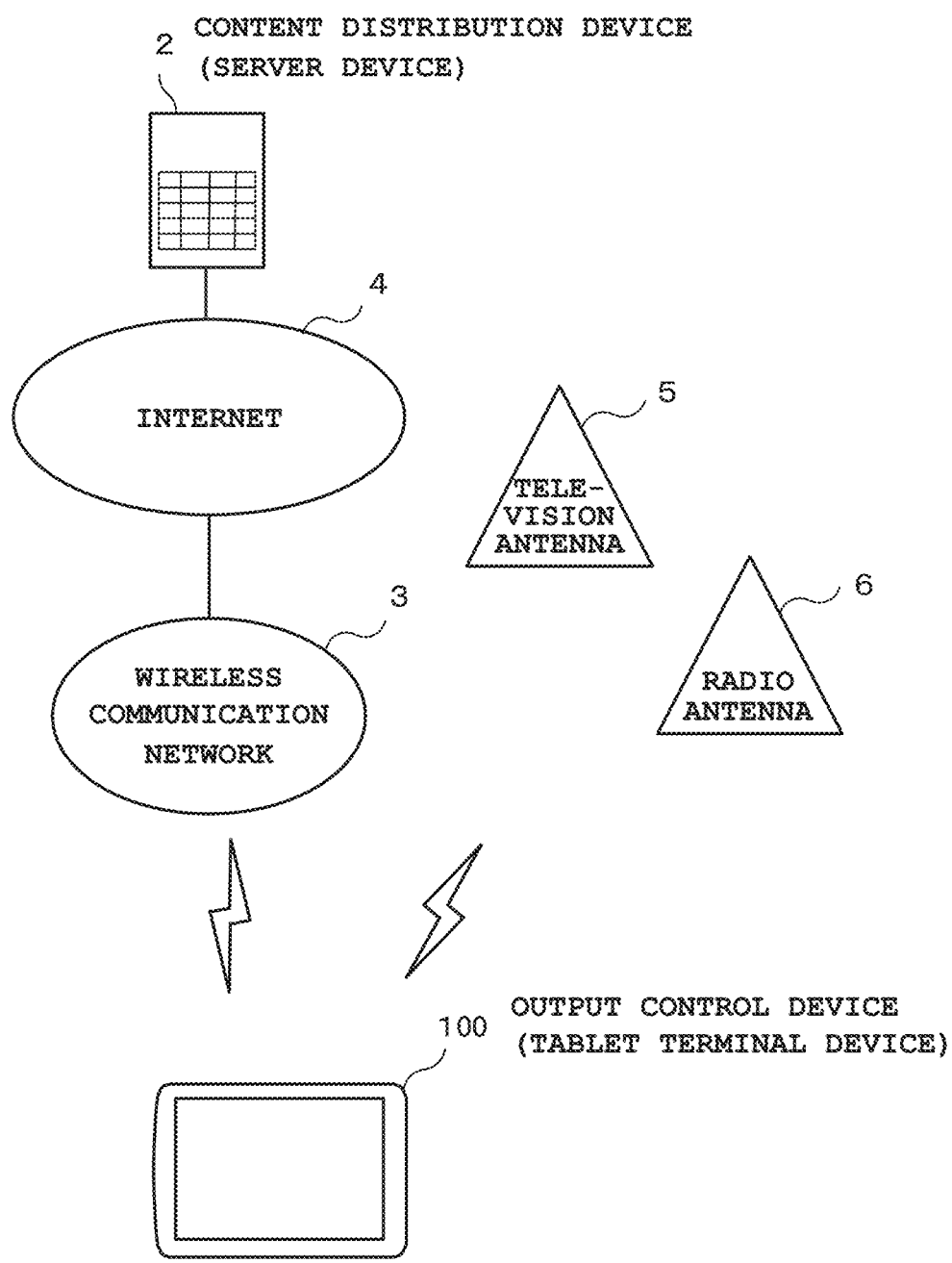
FIG. 1 is a block diagram showing a communication system where a tablet terminal device in which the present invention has been applied as an output control device can be used.

The present embodiment is an example where the present invention has been applied in a portable terminal device (tablet terminal) as an output control device, and FIG. 1 is a block diagram showing a communication system in which this tablet terminal device can be used.

An output control device (tablet terminal device) 100 in FIG. 1 includes a sentence creation function, a clock function, a touch input function, a wireless communication function, an Internet connecting function, a Web browser function, and a television/radio broadcast receiving function, and the like as basic functions. In the clock function, the current time (year/month/day/hour/minute/second/millisecond) is kept, and a time set by a timer is clocked.

The tablet terminal device 100 can output various types of content (for example, Web page data, television broadcast data, radio broadcast data, moving image data, still-image-group data, and audio data). Also, this tablet terminal device 100 causes a Web page received from a content distribution apparatus (server apparatus) 2 via communication network (wireless communication network 3 and the Internet 4) to be displayed on a display screen of the tablet terminal device 100, causes video data of a television broadcast program received from a television station via a television antenna 5 to be displayed on the display screen, causes audio data of a radio program received from a radio station via a radio antenna 6 to be outputted from a loudspeaker, and causes moving image data, still-image-group data, electronic book data, and the like externally supplied from a removable portable memory (recording medium) to be displayed on the display screen.

Note that the tablet terminal device 100 may receive a terrestrial digital broadcast (television/radio program) by downloading the data thereof via the Internet 4.

Figure 2:
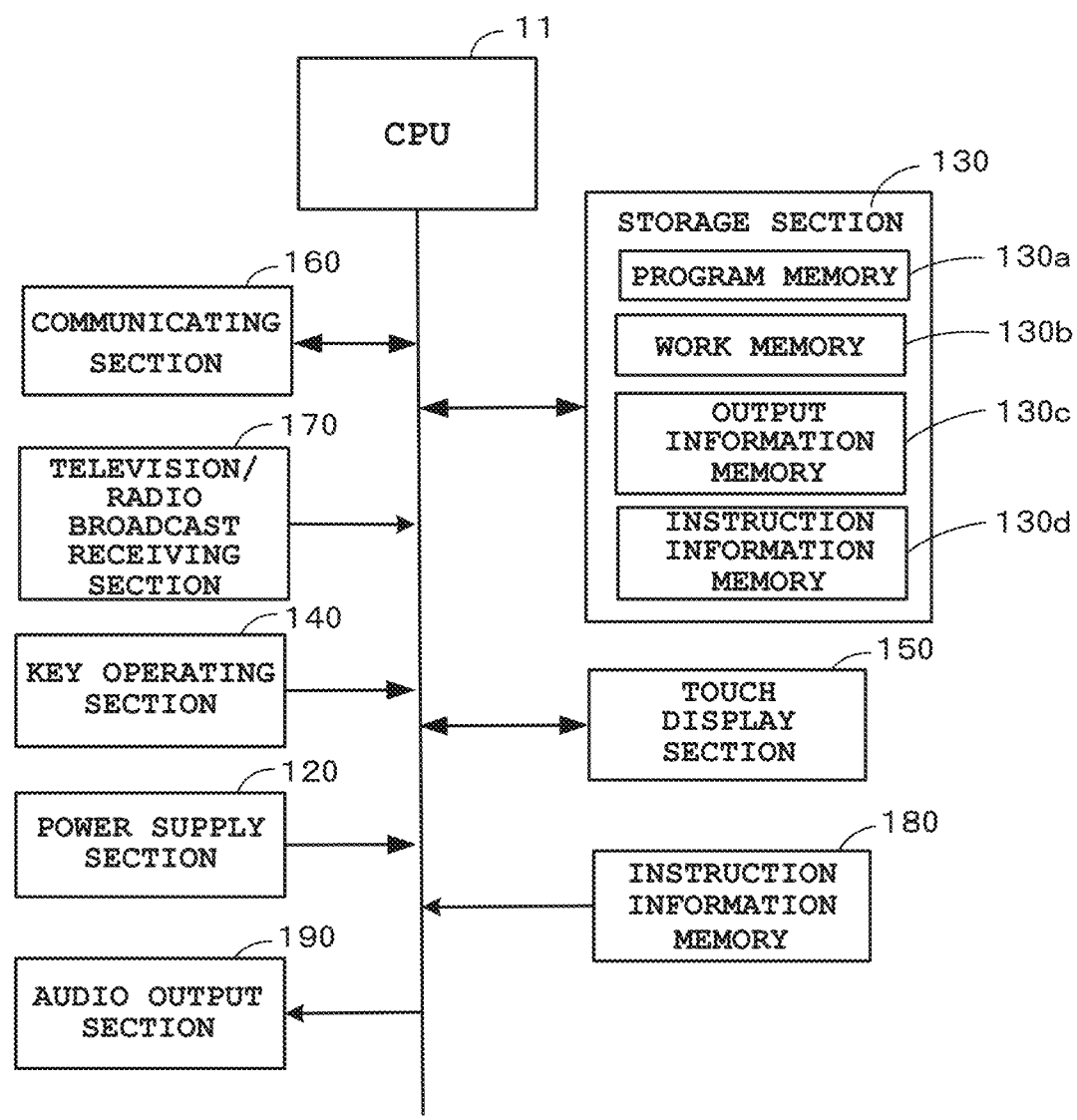
FIG. 2 is a block diagram showing basic components of a tablet terminal device 100.

FIG. 2 is a block diagram showing basic components of the tablet terminal device 100.

A CPU 110 in FIG. 2 serving as the core of the tablet terminal device 100 is a central processing unit which operates with power supply from a power supply section (secondary battery) 120 and controls the entire operation of the tablet terminal device 100 by following various programs in a storage section 130. The storage section 130 is structured to have, for example, a ROM (read-only memory) and a flash memory, and includes a program memory 130a that stores a program for achieving the present embodiment according to an operation procedure shown in FIG. 5 and FIG. 6, a work memory 130b that temporarily stores various data (such as a clocked time, a time set by a timer, and a flag) required in this tablet terminal device 100, and an output information memory 130c and an instruction information memory 130d described below.

The storage section 130 may be structured to include, for example, a removable portable memory (recording medium) such as an SD (Secure Digital) card or an IC (Integrated Circuit) card, or may be structured to include, although not shown, a storage area on a predetermined server apparatus side in a case where the tablet terminal device 100 is connected to a network by a communication function.

The CPU 110 has connected thereto a key operating section 140, a touch display section 150, a communicating section 160, a television/radio broadcast receiving section 170, a mouse operating section 180, and an audio output section 190 serving as input/output devices, and controls each of the input/output devices in accordance with an input/output program. The key operating section 140 includes a push-button key such as a power supply key for turning a power supply ON/OFF, on which a keyboard can be externally provided (omitted in the drawing).

The touch display section 150 constitutes a touch screen on which function names serving as software keys and various icons are displayed, or a touched point is detected and its coordinate data is inputted.

The communicating section 160 is a communication module capable of high-speed large-capacity communication, and connected to, for example, a wireless LAN (Local Area Network). A Web page received thereby via the Internet 4 is displayed on the touch display section (display screen) 150. The television/radio broadcast receiving section 170 receives a television broadcast signal and a radio broadcast signal. A video signal received thereby is provided to the touch display section 150 for display, and an audio signal received thereby is provided to the audio output section 190 for audio output. The mouse operating section 180 is a mouse serving as a pointing device, with which an operation of moving a mouse cursor, a click operation, and the like are performed on the display screen.

FIGS. 3A and 3B are diagrams for describing the output information memory 130c.

FIG. 3A shows a state where individual pieces of data (for example, images) constituting content (Web page data) are sequentially read out from the content distribution apparatus 2 via a communication network (the wireless communication network 3 and the Internet 4), and arranged and displayed on the display screen while the layout of the entire page is adjusted. This drawing exemplarily depicts a display screen where image A and image B have been arranged and displayed on a Web page. FIG. 3B is a diagram showing details of the output information memory 130c in this case.

The output information memory 130c is a memory which temporarily stores output timing as an output status (output information) every time an individual piece of data constituting content is outputted by sequential output. As shown in FIG. 3B, the output information memory 130c includes fields of "data number", "data name", "data size", "data attachment position", "link destination", and "time stamp at data reading". "Data number" indicates a serial number (data identification information) that is generated every time an individual piece of data is outputted on a Web page, which is updated every time this piece of data is outputted. "Data name" indicates data identification information such as "image A" and "image B", In this example, image A is arranged and displayed first, and then image B is arranged and displayed, as shown in FIG. 3A. "Data size" indicates the size (lateral width and vertical width) of data on the display screen. In this example, image A has a size of 200×100 dots, and image B has a size of 900×80 dots, as shown in FIG. 3A.

"Data attachment position" indicates a position of the upper-left corner of data serving as an attachment position in a plane-coordinate system where the upper-left corner of the display screen is the origin. The attachment position of image A has an X coordinate value of 50 dots and a Y coordinate value of 500 dots, and the attachment position of image B has an X coordinate value of 50 dots and a Y coordinate value of 800 dots, as shown in FIG. 3A. "Link destination" indicates information of details of processing on this data (processing identification information). In this example, "link destination" indicates the URLs (Uniform Resource Locator) of link destinations linked to image A and image B in this content.

"Time stamp at data reading" indicates a time acquired by the clock function when data is read out, which is information of data output timing, or in other words, information where a data reading time has been taken as a data output time. In this example, "time stamp at data reading" indicates "2013.03.26.09:47:50:000 (year/month/day/hour/minute/second/millisecond)" for image A, and "2013.03.26.09:47:51:500 (year/month/day/hour/minute/second/millisecond)" for image B.

FIGS. 4A, 4B, and 4C are diagrams for describing the instruction information memory 130d.

FIG. 4A shows a screen where a Web page is being read out. In this example, image A such as that shown in FIG. 3A has been arranged and displayed, and a predetermined user instruction has been given on the outputted data (image A). Here, the predetermined user instruction in the first embodiment refers to an operation (jump instructing operation) of selecting and specifying data linked to a link destination so as to jump to the link destination when content is being outputted. This operation may be a key operation by the key operating section 140, a touch operation (tap operation) by the touch display section 150, or a click operation by the mouse operating section 18. In this example, a touch operation (tap operation) has been performed.

FIG. 4B shows a screen where the Web page has been read out (the display of the entire data has been completed). In this example, image B has been arranged and displayed following the display of image A. In this case, the display position of image A on the screen during the image reading and the display position of image A on the screen after the completion of the image reading are different. That is, when the Web page is being read out, the data are arranged and displayed in order starting from the first read-out data. Therefore, the display position during the reading and the display position after the entire data is read out are different.

Accordingly, even when a user instructing operation (jump instructing operation) is performed on arbitrary data (such as image A) as shown in FIG. 4A, data reading and data display are performed before jump processing is performed in response to the instruction. As a result, a screen such as that shown in FIG. 4B is displayed, whereby the user instruction is recognized to have been performed on not the data of image A but the data of image B, and a jump is made to a wrong link destination.

In the first embodiment, when a predetermined user instruction is given while content is being read out, its instruction status is temporarily stored in the instruction information memory 130d. The instruction information memory 130d is a memory which temporarily stores, as instruction statuses, the time (instruction timing) at which a predetermined user instruction (jump instructing operation) has been performed on data while pieces of data constituting content are being sequentially read out, and the point on which the instruction has been given (instruction point). This instruction information memory 130d includes fields of "instruction number", "instruction timing", and "instruction point", as shown in FIG. 4C.

"Instruction number" indicates a serial number (instruction identification information) generated every time a user instruction is provided while content is being outputted. "Instruction timing" indicates the time (year/month/day/hour/minute/second/millisecond) acquired by the clock function when a jump instructing operation is performed on outputted data. "Instruction point" indicates a point on the display screen where a predetermined user instruction has been given while data is being outputted. The shown example has an X coordinate value of 80 dots and a Y coordinate value of 700 dots.

By using the above-structured instruction information memory 130d, the CPU 110 checks "instruction timing" and "instruction point" in the instruction information memory 130d against "data size", "data attachment position", and "time stamp at data reading" in the output information memory 130c, and thereby specifies data that has been outputted at the point of "instruction timing".

That is, "instruction timing", which indicates timing at which a predetermined user instruction has been given while data is being outputted, is checked against "time stamp at data reading" indicating the timing of data output. If data that has been outputted at the point of "instruction timing" is present, "instruction point" is checked against "data size" and "data attachment position". Here, if data outputted at "instruction point" is present, this data is specified. Then, the CPU 110 specifies "link destination" in the output information memory 130c indicating processing details associated with the specified data as user-instructed processing details (instructed processing details).

Also, in the first embodiment, processing execution timing according to an instruction operation is either one of (1) timing immediately after the end of the sequential output of content and (2) timing at which a predetermined time has elapsed from instruction timing. From these execution timings (1) and (2), arbitrary timing can be selected in advance by a user operation. Execution timing (1) indicates the end point of content, and processing according to instructed processing details is performed at the end. Execution timing (2) indicates timing at which a predetermined time (for example, five seconds) has elapsed from the above-described instruction timing, and processing according to instructed processing details is performed after the elapse of the predetermined time Note that this predetermined time for determining execution timing (2) can be arbitrarily changed by a user operation.

Next, the operation concept of the output control device (tablet terminal device) 100 in the first embodiment is described with reference to flowcharts shown in FIG. 5 and FIG. 6. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later. Note that these flowcharts in FIG. 5 and FIG. 6 outline operations of the characteristic portion of the first embodiment from among all of the operations of the tablet terminal device 100. After exiting the flows in FIG. 5 and FIG. 6, the procedure returns to the main flow (not shown) of the overall operation.

Figure 5:
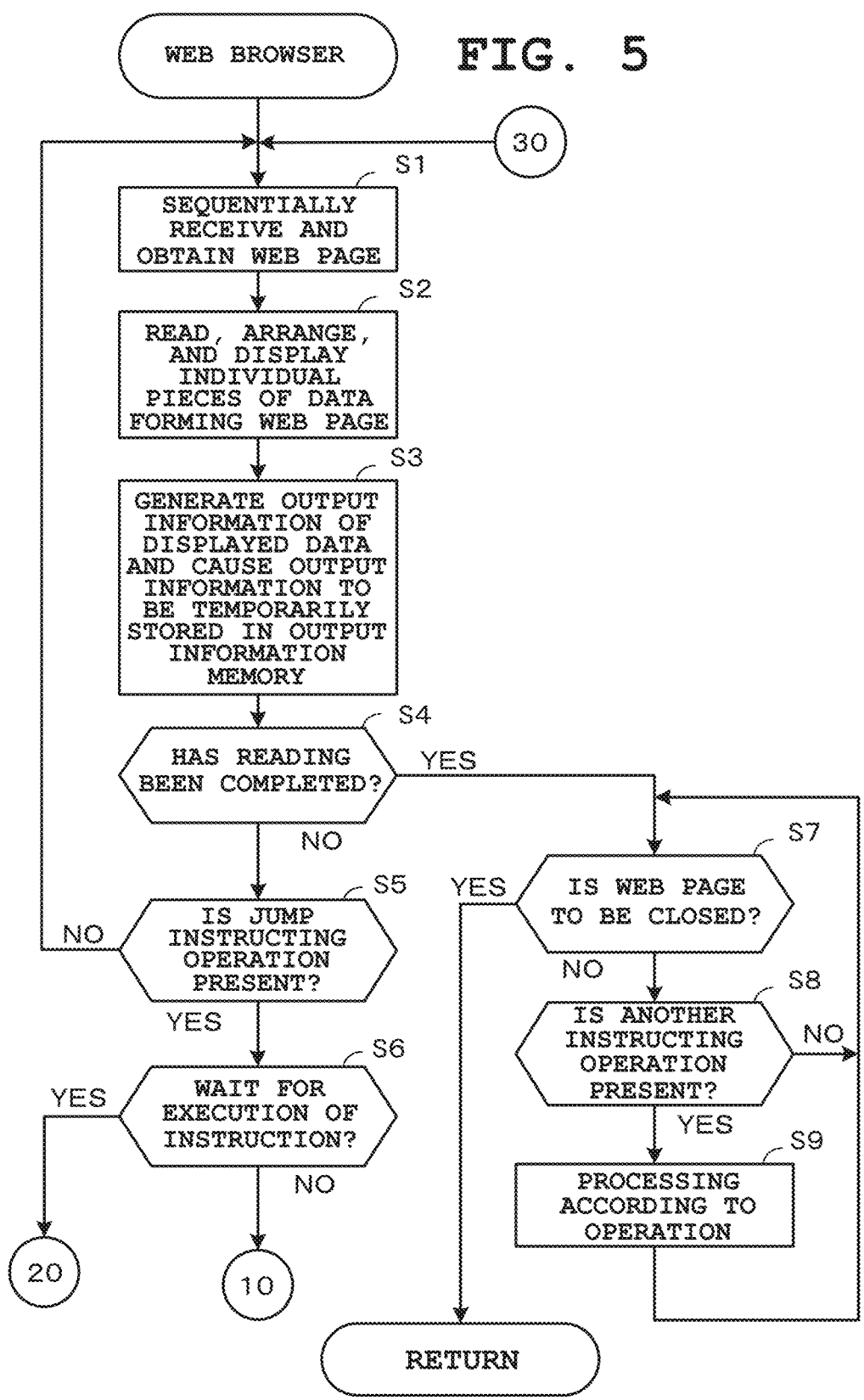
FIG. 5 is a flowchart for describing an operation to be started in response to the start of a Web browser function.
Figure 6:
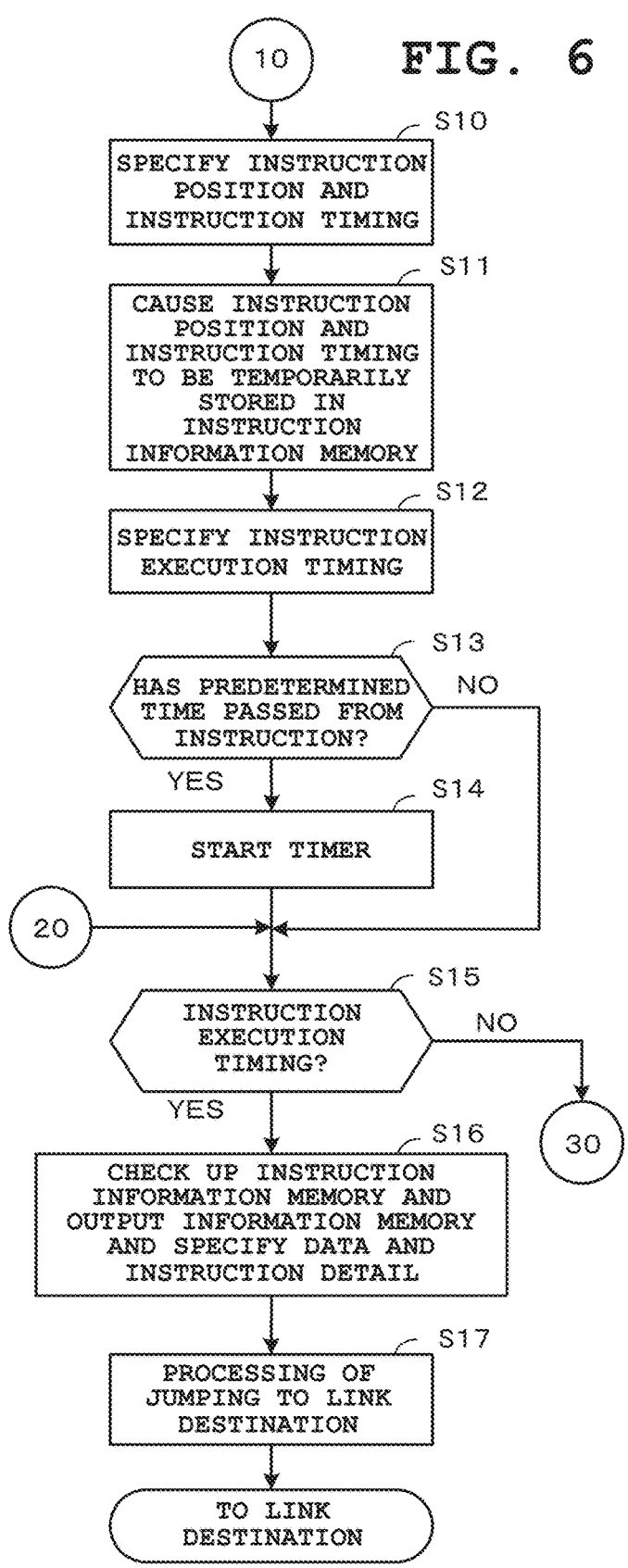
FIG. 6 is a flowchart of an operation following that of FIG. 5.

FIG. 5 and FIG. 6 are flowcharts for describing an operation (a characteristic operation of the present embodiment) that is started in response to the activation of the Web browser function.

First, the CPU 110 sequentially receives and acquires output target content (Web page) from the content distribution apparatus (server apparatus) 2 via the communication network (wireless communication network 3 and the Internet 4) (Step S1 of FIG. 5), and also starts an operation of sequentially reading out individual pieces of data constituting the content (Web page) and arranging and displaying the read out data on the display screen of the touch display section 15 (Step S2). Then, the CPU 110 generates an output status (output information) for each arranged and displayed data, and controls the output information to be temporarily stored in the output information memory 130c (Step S3).

In the present embodiment, the CPU 110 generates this output information by preparing data for each of the fields "data name", "data size", "data attachment position", "link destination", and "time stamp at data reading". For example, in the case of FIG. 3A, the CPU 110 detects "image A" as "data name", "dot size of 200×100 dots" as "data size", "X coordinate value is 50 dots and Y coordinate value is 500 dots" as "data attachment position", "URL information" as "link destination", and "2013.03.26.09:47:50:000 (year/month/day/hour/minute/second/millisecond)" as "time stamp at data reading" so as to generate output information, updates "data number", and controls the output information to be temporarily stored in the output information memory 130c.

Then, the CPU 110 judges whether the output target content (Web page) has been completely read out (whether the reading has been completed) (Step S4). When judged that the reading has not been completed (NO at Step S4), or in other words, when judged that the reading is still being performed, the CPU 110 judges whether a predetermined user instruction (jump instructing operation) has been performed on data on the display screen where a link destination has been linked (Step S5). Here, when judged that no jump instructing operation has been performed (NO at Step S5), the CPU 110 returns to the above-described Step S1 to perform the above-described processing.

Also, when the reading of the Web page is completed (YES at Step S4) without a jump instructing operation being performed (NO at Step S5), the CPU 110 judges whether an operation of closing the Web page has been performed (Step S7) and judges whether another instructing operation (for example, a page store instructing operation or a print instructing operation) has been performed (Step S8). Here, when judged that another instructing operation has been performed (YES at Step S8), the CPU 110 performs storing processing and printing processing (Step S9) as processing in response to the operation, and then returns to Step S7.

On the other hand, when a jump instructing operation is performed (YES at Step S5) before the reading of the Web page is completed (NO at Step S4), the CPU 110 judges whether the current state is a waiting state for the execution of this instruction, or in other words, judges whether execution timing for this instruction has been reached (Step S6). Here, in a case where a jump instructing operation has been performed for the first time after the start of the output of the content, the current state is not awaiting state for the execution of this instruction (NO at Step S6). Therefore, the CPU 110 proceeds to Step S10 of FIG. 6, and acquires a coordinate point on the display screen as an instruction point and the time (year/month/day/hour/minute/second/millisecond) acquired by the clock function as instruction timing. Then, the CPU 110 performs processing for controlling these instruction point and instruction timing to be temporarily stored in the instruction information memory 130d (Step S11).

Next, the CPU 110 specifies execution timing for the instruction (Step S12). In this case, the CPU 110 judges whether arbitrary execution timing selected in advance by a user operation is timing that comes after the elapse of a predetermined time (for example, five seconds) from the instruction timing, that is, execution timing (2) (Step S13). When judged that the execution timing is timing that comes immediately after the end of the sequential output of the content, that is, execution timing (1) (NO at Step S13), the CPU 110 directly proceeds to Step S15. When judged that the execution timing is execution timing (2) (YES at Step S13), the CPU 110 starts a measuring operation by a timer (omitted in the drawing) (Step S14), and proceeds to Step S15 to judge whether the execution timing has been reached.

Here, in a case where execution timing (1) has been selected by the user, the CPU 110 judges whether the end of the sequential output of the content has been detected. In a case where executing timing (2) has been selected by the user, the CPU 110 judges whether the value thereof has reached the predetermined time (for example, five seconds). Here, when the execution timing for the instruction has not been reached (NO at Step S15), the CPU 1 returns to Step S1 of FIG. 5. when the execution timing is detected to have been reached (YES at Step S15), the CPU 110 checks details of the output information memory 130c against details of the instruction information memory 130d to specify user-instructed data, and performs processing for specifying instructed processing details (Step S16).

That is, the CPU 110 checks "instruction timing" and "instruction point" in the instruction information memory 130d against "data size", "data attachment position", "time stamp at data reading" in the output information memory 130c to specify data outputted at the "instruction timing" at the instruction point. Subsequently, the CPU 110 specifies "link destination" in the output information memory 130c associated with the specified data as an instructed processing detail. Then, after performing processing for reading out the specified "link destination" as the instructed processing detail and making a jump to the link destination indicated by its URL (Step S17) the CPU 110 exits the flows of FIG. 5 and FIG. 6 to proceeds to processing at the jump destination.

As described above, in the first embodiment, when a predetermined user instruction is given to data outputted while pieces of data constituting content are sequential outputted, the CPU 110 detects the instruction timing, controls the detected instruction timing to be stored in the instruction information memory 130d, specifies a predetermined timing later than the instruction timing stored in the instruction information memory 130d as execution timing for processing in accordance with the user instruction, and performs this processing. Therefore, even when a predetermined user instruction is given while content is being outputted, processing according to the user instruction can be performed at appropriate timing, whereby the content can be smoothly outputted.

Also, in the first embodiment, processing execution timing according to instructed processing details is timing that comes immediately after the end of sequential output of content or timing that comes after the elapse of a predetermined time from instruction timing. As a result of this configuration, even when a predetermined user instruction is given while content is being outputted, the content can be smoothly outputted without the user overlooking or misidentifying important portion by the sudden data switching.

Moreover, from among data already sequentially outputted while content is being outputted, the CPU 110 specifies data in the instruction information memory 130d which has been outputted at the point of instruction timing, specifies processing details associated with the specified data as instructed processing details, and performs this processing. As a result of this configuration, instructed processing details can be specified based on instruction timing.

Furthermore, in the first embodiment, the output information memory 130c is provided which stores "time stamp at data reading" as output timing, in association with individual pieces of data constituting content. The CPU 110 checks "time stamp at data reading (output timing)" in the output information memory 130c against instruction timing in the instruction information memory 130d, and thereby specifies data that has been outputted at the point of the instruction timing. As a result of this configuration, data for which an instruction has been given can be appropriately specified based on the instruction timing.

Still further, the output information memory 130c stores not only output timing but also processing details in association with individual pieces of data constituting content. The CPU 110 checks output timing in the output information memory 130c against instruction timing in the instruction information memory 130d so as to specify data that has been outputted at the point of the instruction timing, specifies processing details associated with the specified data as instructed processing details, and performs this processing. As a result of this configuration, easy and reliable specification can be achieved.

Yet still further, every time an individual piece of data constituting content is outputted by sequential output, output timing and processing details associated with the outputted data are generated as output information and stored in the output information memory 130c. As a result of this configuration, output information can be generated when content is outputted, without output information for each content being prepared in advance.

Yet still further, content is Web page data constituted by plural pieces of data received via the communication network (wireless communication network 3 and the storage section 13 of the Internet 4) and, every time each piece of sequentially-received data constituting a Web page is arranged on the display screen in sequential arrangement, the CPU 110 generates output timing and processing details in association with the arranged and displayed data as output information, and stores the generated output information in the output information memory 130c. As a result of this configuration, output information can be generated only by receiving a Web page.

Yet still further, the CPU 110 judges whether a predetermined user instruction has been given, based on whether a user operation has been performed for indicating an arbitrary point on the display screen where pieces of data constituting content are sequentially displayed. Then, when judged that a predetermined user instruction has been given, the CPU 110 detects the instruction timing and the indicated point, and stores the detected results in the instruction information memory 130d. In this state, the CPU 110 refers to the instruction information memory 130d to specify data that has been displayed at the indicated point at the instruction timing, specifies processing details associated with the specified data, and performs the processing. As a result of this configuration, even when plural pieces of data have been outputted at the point of instruction timing, indicated data and processing details can be appropriately specified.

In the above-described first embodiment, a description regarding the number of times of user instructions when content is being outputted has not been particularly given. However, a configuration may be adopted in which, when a predetermined user instruction is provided a plurality of times, instruction timing is detected for each instruction and stored in the instruction information memory 130d. In this configuration, when a plurality of instruction timings are judged to have been stored as a result of the instruction information memory 130d being referred, processing execution timing according to instructed processing details is specified for each instruction timing, and corresponding processing is sequentially performed. By this configuration, cases where a plurality of user instructions are given can be supported.

Also, the present invention is not limited to the configuration in which, when a plurality of instruction timings have been stored in the instruction information memory 130d, a plurality of processing operations are sequentially performed in accordance with user instructions. For example, a configuration may be adopted in which processing execution timing according to instructed processing details is specified based on arbitrary instruction timing selected and specified by a user operation from among a plurality of instruction timings, and the processing is performed. By this configuration, even when a plurality of user instructions are inadvertently given, processing desired by the user is performed. In addition, even if these user instructions are purposeful instructions, processing with a high degree of importance is prioritized for execution.

Moreover, in the above-described first embodiment, processing execution timing according to instructed processing details is either one of execution timing (1) representing timing immediately after the end of sequential output of content and execution timing (2) representing timing that comes after the elapse of a predetermined time from instruction timing. However, the present invention is not limited thereto. For example, the processing execution timing may be timing at which a breakpoint of content is detected or timing that comes every time a predetermined time elapses after the start of content output. Also, in the above-described first embodiment, processing execution timing can be arbitrarily selected in advance from execution timing (1) and execution timing (2) by a user operation. However, the execution timing may be fixed for each type of content.

Furthermore, in the above-described first embodiment, a Web page has been exemplarily described as content. However, the present invention is not limited thereto. For example, the present invention may be applied in a case where image (moving image) data acquired by a digital camera is replayed as content. In this case, output timing indicating a time to be elapsed for playback from when data playback is started until when data is replayed may be stored in the output information memory 130c in association with individual pieces of data (frames) constituting content. Also, in this case, processing details (such as skip or fast-forward) may be provided by a user operation. As such, the present embodiment can be similarly applied to the case where content is captured image (moving image) data.

Also, this captured image data is not limited to moving image data, and may be a plurality of still image (still image group) data. In addition, the present invention may be applied in a case where these still images are subject to slideshow display (sequential switching display). In this case, in a slideshow where images are automatically switched and displayed for every predetermined time, a value obtained by multiplying the remaining number of images by a switching time is stored in the output information memory 130c as output timing. In this case as well, processing details (such as skip and fast-forward) may be provided by a user operation. As such, the present invention can be similarly applied in the case where captured images (still images) serving as content are replayed and displayed in a slideshow.

Second Embodiment

Hereafter, a second embodiment of the present invention is described with reference to FIG. 7A to FIG. 12.

Figure 7A:
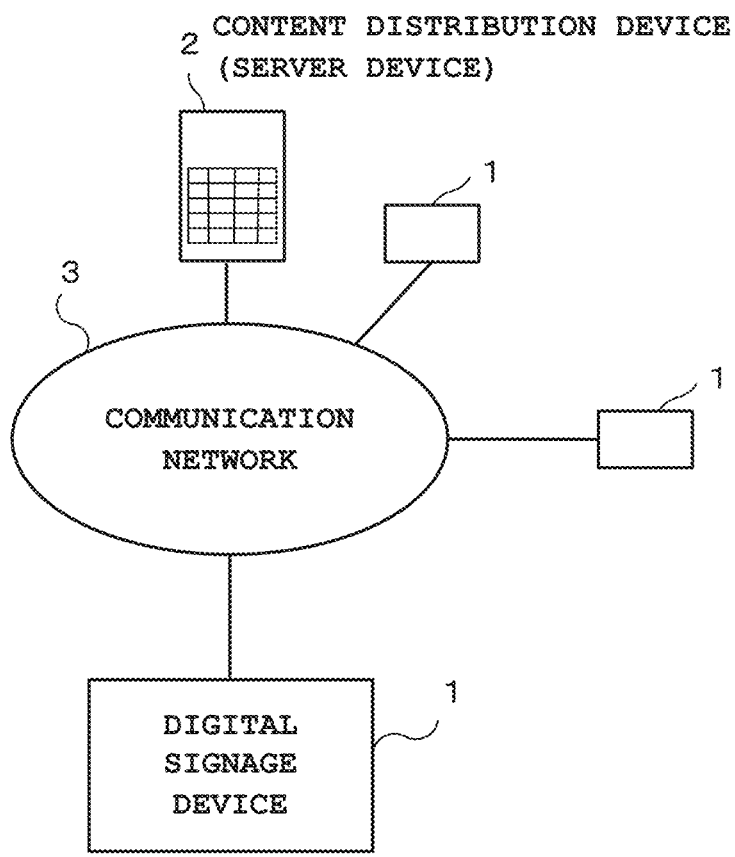
FIG. 7A is a block diagram showing a communication system including a digital signage apparatus.

The present embodiment is an example where the present invention has been applied in a digital signage apparatus as an advertisement output apparatus, and FIG. 7A is a block diagram showing a communication system including this digital signage apparatus.

An advertisement output apparatus (digital signage apparatus) 1 in FIG. 7A is installed in a place where customers gather, such as an area near an entrance, a rest place, and an exit inside a large store. This advertisement output apparatus 1 is capable of outputting various advertisement data (such as Web page data, television broadcast data, moving image data, still-image-group data, and audio data), and includes an advertisement data output function, a clock function, a touch input function, a communication function, an imaging function, an image analyzing function, an audio analyzing function, and the like as basic functions.

The advertisement output function is a function for displaying and outputting advertisement data received from the content distribution apparatus (server apparatus) 2 via a communication network 3 such as the Internet or a LAN (Local Area Network) or advertisement data externally supplied via a removable portable memory (recording medium), and for outputting audio for viewers. Note that the viewers in the present embodiment are store customers. The store customers herein are not limited to customers who are looking at advertisement display and listening to its advertisement audio, and may be customers who are just looking at advertisement display or customers who are just listening to advertisement audio. The clock function is a function for keeping the current time (year/month/day/hour/minute/second/millisecond) or clocking a time set by a timer. The other functions will be described further below.

Figure 7B:
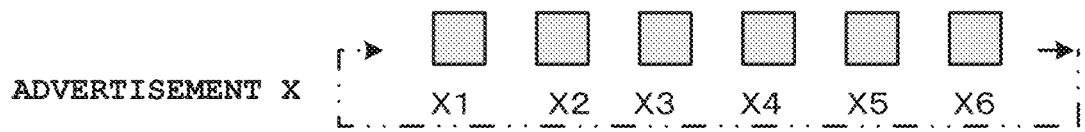
FIG. 7B is a diagram showing an example of advertisement data X.
Figure 7C:
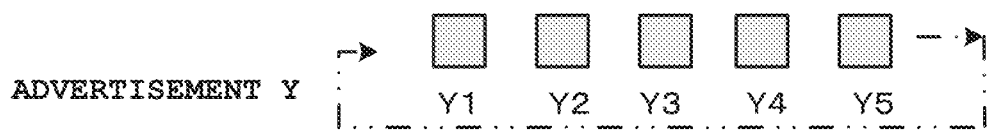
FIG. 7C is a diagram showing an example of advertisement data 1.

The above-described advertisement data is sequential data constituted by a plurality of pages (screens). Advertisement data X in an example shown in FIG. 7B is configured to have data X1 on the first page, data X2 on the second page, . . . , and data X6 on the sixth page. The digital signage apparatus 1 sequentially outputs these data X1, X2, . . . , X6 constituting the advertisement X by page (screen) and, after outputting the final page X6, returns to the head page X1 for output. That is, after being sequentially outputted in one cycle, the data of the respective pages (screens) are again cyclically and sequentially outputted by being switched. Similarly, advertisement data Y in an example shown in FIG. 7C is configured to have data Y1 on the first page, data Y2 on the second page, . . . , and data Y5 on the fifth page. The digital signage apparatus 1 sequentially outputs these data Y1, Y2, . . . , Y5 constituting the advertisement Y by page, which are cyclically outputted by being switched.

Figure 8:
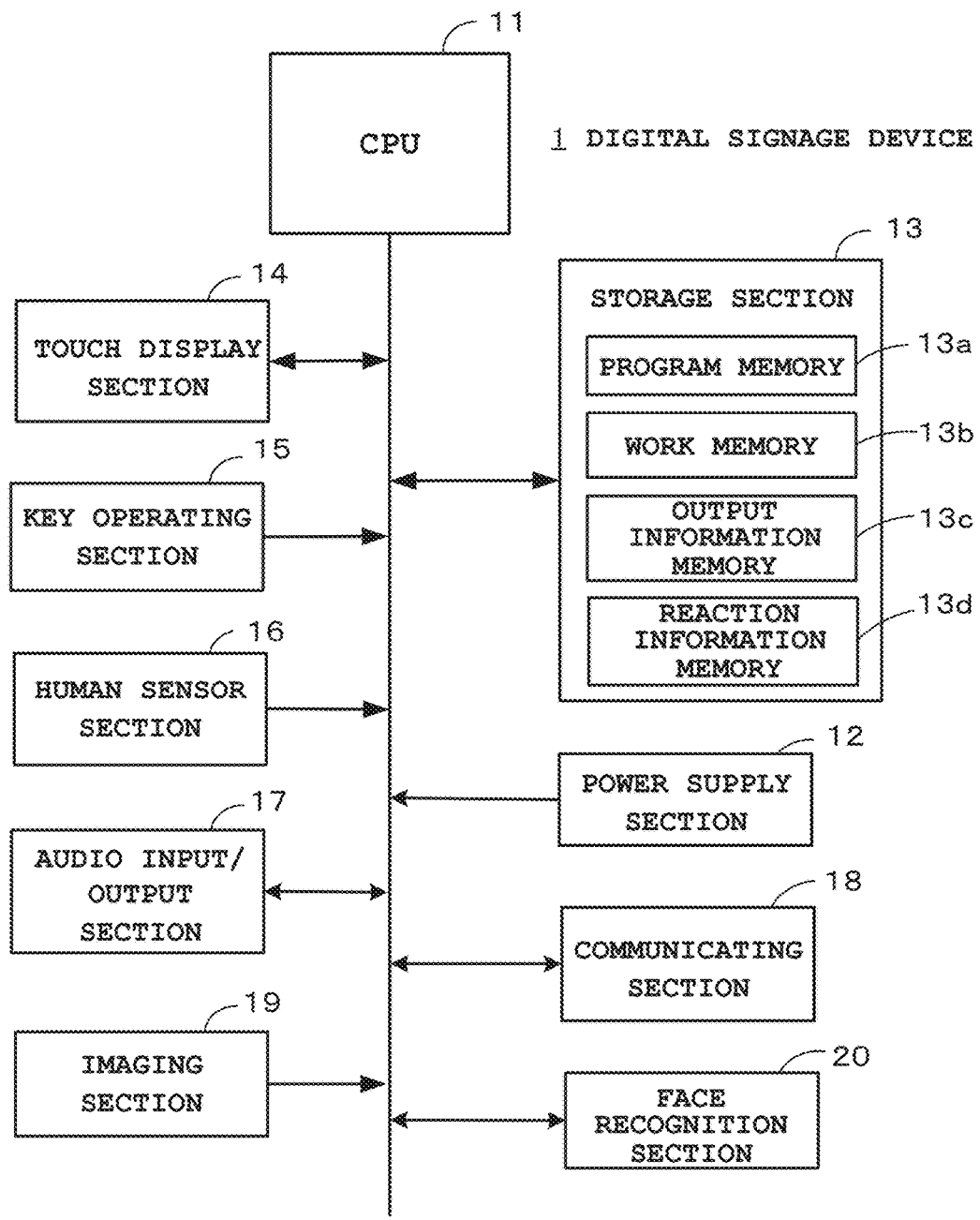
FIG. 8 is a block diagram showing basic components of a digital signage apparatus 1.

FIG. 8 is a block diagram showing basic components of the digital signage apparatus 1.

A CPU 11 in FIG. 8 serving as the core of the digital signage apparatus 1 is a central processing unit which operates with power supply from a power supply section 12, and controls the entire operation of the digital signage apparatus 1 by following various programs in a storage section 13. The storage section 13 is structured to have, for example, a ROM and a flash memory, and includes a program memory 13a that stores a program for achieving the present embodiment according to an operation procedure shown in FIG. 10 to FIG. 12, a work memory 13b that temporarily stores various data (such as a clocked time, a time set by a timer, and a flag) required in this digital signage apparatus 1, and an output information memory 13c and a reaction information memory 13d described below. This storage section 13 may be structured to include, for example, a removable portable memory (recording medium) such as an SD card or an IC card, or may be structured to include, although not shown, a storage area on a predetermined server apparatus side in a case where the digital signage apparatus 1 is connected to a network by a communication function.

The CPU 11 has connected thereto a touch display section 14, a key operating section 15, a human sensor section 16, an audio input/output section 17, a communicating section 18, an imaging section 19, a face recognition section 20, and the like as input/output devices, and controls each of the input/output devices in accordance with an input/output program. The touch display section 14 constitutes a touch screen (touch input function) on which advertisement data and function names serving as software keys are displayed, or a touched point is detected and its coordinate data is inputted. The key operating section 15 includes a push-button key such as a power supply key for turning a power supply ON/OFF.

The human sensor section 16, which is arranged on the screen (advertisement screen) side of the touch display section 14, is an infrared ray sensor for human detection which detects whether a viewer (customer) is present near the advertisement screen. When the human sensor section 16 detects that a customer is present nearby, the CPU 11 controls the audio input/output section 17 and the imaging section 19 to be driven. When the human sensor section 16 detects that no customer is nearby, the CPU 11 controls the driving of the audio input/output section 17 and the imaging section 19 to be stopped. The audio input/output section 17 has a microphone and a loudspeaker to output advertisement data as audio and receive input of voice from a customer while the human sensor section 16 is detecting the customer, and is arranged toward the advertisement screen side. The CPU 11 analyzes voice from a customer inputted from this audio input/output section 17 and thereby judges whether a predetermined voice described below is included.

The communicating section 18 is a communication module (communication function) capable of high-speed large-capacity communication in which advertisement data is received from the content distribution apparatus 2 via the communication network 3. The imaging section 19, which is arranged on the advertisement screen side, is a digital camera (imaging function) that mainly captures an image of the face of a customer viewing the advertisement screen while the human sensor section 16 is detecting the customer. The face recognition section 20 achieves an image analyzing function for analyzing an image of the face of a customer captured by the imaging section 19 and detecting the facial expression. Based on a change in the facial expression, the face recognition section 20 recognizes whether the customer is interested in the advertisement.

FIG. 9A is a diagram for describing the output information memory 13c, and FIG. 9B is a diagram for describing the reaction information memory 13d.

The output information memory 13c is a memory that temporarily stores output timing as an output status (output information) every time an individual piece of data constituting an advertisement is outputted to the advertisement screen by sequential output. This output information memory 13c has fields of "data number", "data name", "time stamp at data reading", and "link destination", as shown in FIG. 9A.

"Data number" indicates a serial number (information for identifying data in the memory) that is generated every time an individual piece of data is outputted, which is updated every time a piece of data is outputted in sequential output. "Data name" indicates data identification information such as "image X1" and "image X". "Time stamp at data reading" indicates a time acquired by the clock function when output target data is read out. In this example, "time stamp at data reading" indicates "2013.03.26.09:47:50:000 (year/month/day/hour/minute/second/millisecond)" for image X1 and "2013.03.26. 09:47:55:500 (year/month/day/hour/minute/second/millisecond)" for image X2. "Link destination" indicates data details (for example, product description information) or the URL (Uniform Resource Locator) of a link destination.

The reaction information memory 13d is a memory that temporarily stores, as reaction timing, timing at which a customer has reacted to an advertisement while its advertisement data is being outputted. This reaction information memory 13d has fields of "data number", "data name", and "reaction timing", as shown in FIG. 9B. "Data number" indicates a serial number for identifying data in the memory. "Reaction timing" is the time acquired by the clock function when a reaction of a customer to an advertisement is detected while its advertisement date is being outputted, such as when a specific word from the customer is detected or a facial expression of the customer representing that the customer is interested in the advertisement is detected. In this example, "2013.03.26.09:47:52:000 (year/month/day/hour/minute/second/millisecond)" has been taken as "reaction timing" for image X1.

Here, the above-described specific word from a customer is a positive word such as "I want to buy it", "I like it", "it's cool", or "it looks delicious". When a customer utters words including any of these words while viewing the advertisement screen, it is considered that the customer has reacted to the advertisement. Note that the specific word is not limited to a positive word, and a negative word for the advertisement may be considered as a reaction from a customer. The above-described facial expression of a customer representing that the customer is interested in an advertisement is, for example, a facial expression when a customer looking at the advertisement screen is staring at one point for more than a predetermined period of time without changing the sight line direction. When the facial expression of a customer is changed to this facial expression while the customer is viewing the advertisement screen, it is considered that the customer has reacted to the advertisement. Note that the facial expression is not limited to that of when a customer is staring at one point, and may be a facial expression when the pupils of a customer's eyes are wide open for more than a predetermined period of time (when the customer is surprised), or a facial expression when the mouth of a customer is open (when the customer is smiling).

After detecting timing at which a customer has reacted as first timing as described above and temporarily storing the first timing in the reaction information memory 13d, the CPU 11 detects, as second timing (output timing), timing later than this "reaction timing", that is, timing when one cycle of the sequential output of a series of advertisement data constituted by a plurality of pages is completed (the timing of returning to the head page from the last page). At this second timing (output timing), the CPU 11 specifies data that has been outputted at the point of the reaction timing (first timing), and performs output control for the specified data. In this embodiment, the CPU 11 outputs the specified data again as it is, or newly outputs detailed data linked to this data.

Next, the operation concept of the digital signage apparatus 1 in the second embodiment is described with reference to flowcharts shown in FIG. 10 to FIG. 12. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 10:
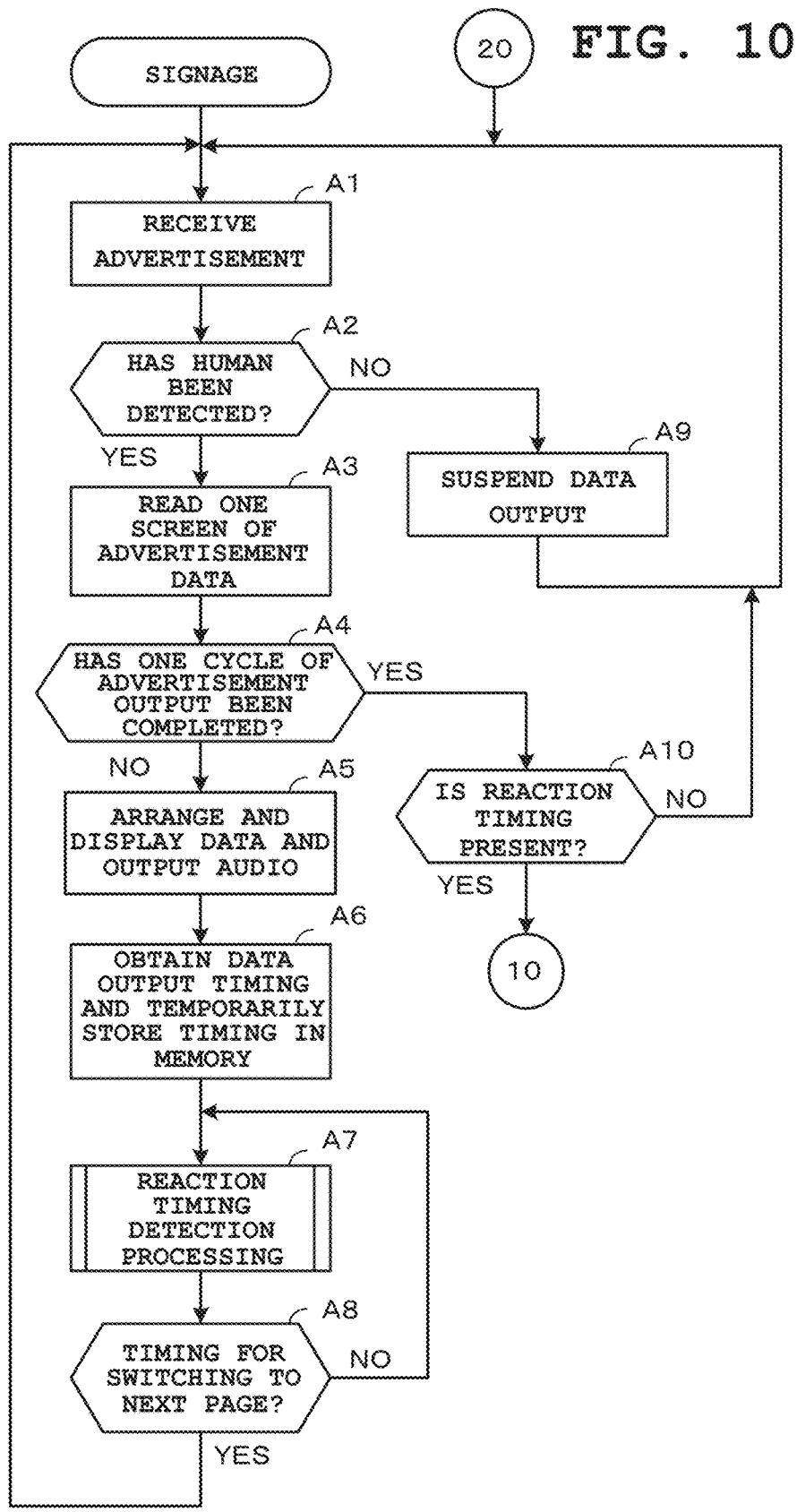
FIG. 10 is a flowchart for describing an operation (a characteristic operation of a second embodiment) of the digital signage apparatus 1 which is started upon power up.
Figure 11:
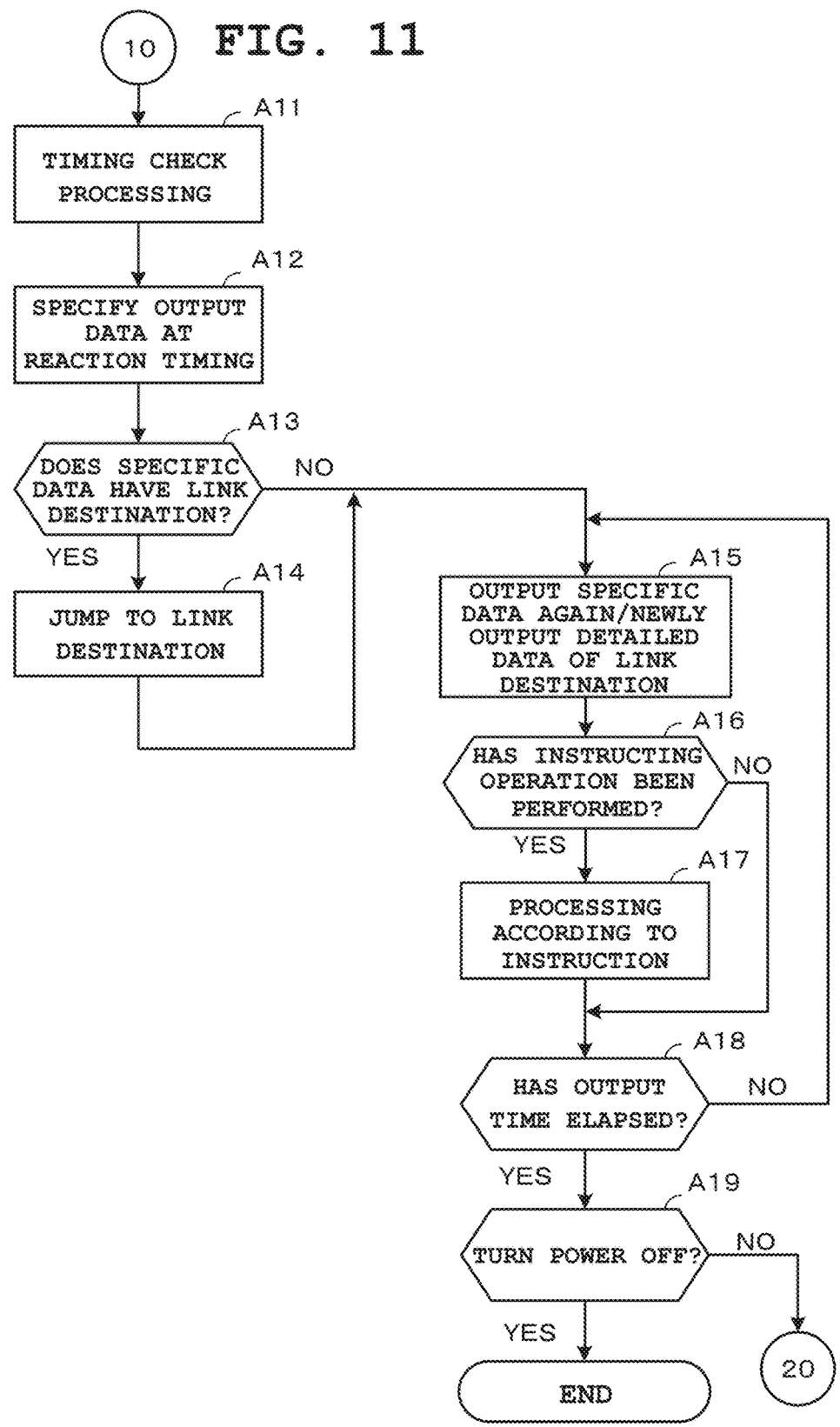
FIG. 11 is a flowchart an operation following that of FIG. 10.

FIG. 10 and FIG. 11 are flowcharts for describing an operation (a characteristic operation of the second embodiment) of the digital signage apparatus 1 which is started upon power up.

First, the CPU 11 enters a state where advertisement data can be received from the content distribution apparatus (server apparatus) 2 via the communication network 3 (Step A1 of FIG. 10). When advertisement data is received, the CPU 11 performs reception processing therefor, and after storing the received data as an output target, judges by the human sensor section 16 whether a customer has been detected, or in other words, judges whether a customer is present near the advertisement screen (Step A2). When judged that no customer is present nearby (NO at Step A2), the CPU 11 causes ongoing data output to be temporarily stopped (Step A9), and then returns to Step A1. Conversely, when judged that a customer is present near the advertisement screen (YES at Step A2), the CPU 11 reads out data for one page (one screen) so as to cyclically and sequentially switch and output advertisement data for a plurality of pages (screens) by page (by screen) (Step A3). Then, the CPU 11 judges whether one cycle of the sequential output has been completed, or in other words, judges whether the timing of proceeding to the reading of the head page from the last page has been reached (screen) (Step A4).

Here, when judged that one cycle of the sequential output has not been completed (NO at Step A4), the CPU 11 arranges and displays the read data on the advertisement screen of the touch display section 14 and, if the data has audio added thereto, outputs the audio data from the audio input/output section 17 (Step A5). Then, the CPU 11 generates "data name", "link destination", and "time stamp at data reading" as information related to the outputted data, and after temporarily storing the generated information in the output information memory 13c (Step A6), proceeds to reaction timing detection processing for detecting a reaction of the customer (Step A7).

Figure 12:
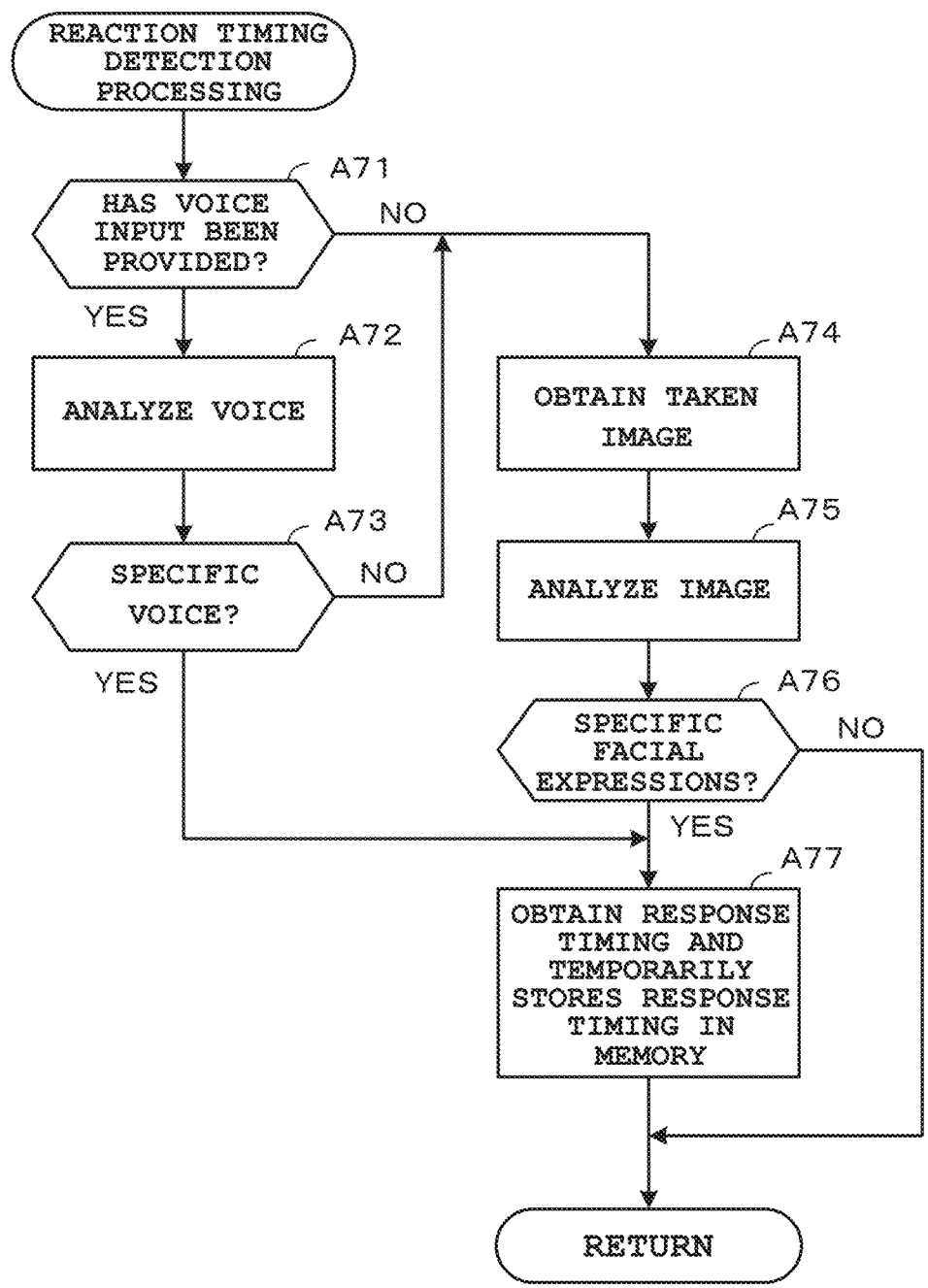
FIG. 12 is a flowchart for describing reaction timing detection processing (Step A7 of FIG. 10) in detail.

FIG. 12 is a flowchart for describing the reaction timing detection processing (Step A7 of FIG. 10) in detail.

First, the CPU 11 judges whether a voice has been inputted from the audio input/output section 17 (Step A71). When judged that no voice has been inputted (YES at Step A71), the CPU 11 analyzes the voice to judge whether the voice is a predetermined voice including a positive word such as "I want to buy it" or "It looks delicious" (Step A72). When judged that the voice is not a predetermined voice (NO at Step A73), the CPU 11 proceeds to the next Step A74. Here, when judged that the voice is a predetermined voice (YES at Step A73), the CPU 11 judges that the customer has reacted to the advertisement, and proceeds to the next Step A77, and performs processing for temporarily storing the time obtained by the clock function at the time of the reaction in the reaction information memory 13d, as reaction timing (first timing).

At Step A71, when judged that no voice has been inputted (NO at Step A71), the CPU 11 proceeds to the next Step A74, and acquires a facial image of the customer captured by the imaging section 19. Subsequently, the face recognition section 20 analyzes the captured image (Step A75). Then, the CPU 11 judges whether the facial expression of the customer is a facial expression showing interest in the advertisement (for example, the customer is staring or surprised at the advertisement, or smiling) (Step A76). When judged that the facial expression of the customer is not a facial expression showing interest (NO at Step A76), the CPU 11 exits the flow of FIG. 12. Conversely, when judged that the facial expression of the customer is a facial expression showing interest (YES at Step A76), the CPU 11 judges that the customer has reacted to the advertisement, and proceeds to the next Step A77. At Step A77, the CPU 11 performs processing for temporarily storing the time acquired by the clock function at the time of the reaction in the reaction information memory 13d, as reaction timing (first timing).

When this reaction timing detection processing (Step A1 of FIG. 10) is completed, the CPU 11 judges whether the timing of switching to the next page (next screen) has been reached (Step A8), and repeatedly returns to the reaction timing detection processing (Step A7) until the switching timing is reached. Then, when judged that the switching timing has been reached (YES at Step A8), the CPU 11 returns to the first Step A1. When the pages of the advertisement data are being sequentially switched to output each page as described above, if the end of one cycle of the advertisement output is detected (YES at Step A4), the CPU 11 refers to the reaction information memory 13d to judge whether reaction timing has been temporarily stored (Step A10). Then, when judged that reaction timing has not been stored (NO at Step A10), the CPU 11 returns to the first Step A1.

Conversely, when judged that reaction timing has been temporarily stored (YES at Step A10), the CPU 11 proceeds to the flow of FIG. 11. Then, by checking information in the reaction information memory 13d against information in the output information memory 13c (Step A11), the CPU 11 specifies data that has been outputted at the point of the reaction timing (Step A12). In the example shown in FIG. 9A and FIG. 9B, " . . . 50:000" has been stored for image X1 and " . . . 0.55:500" has been stored for image X2 as "time stamp at data reading". Here, since "reaction timing" is " . . . 52:000", the CPU 11 specifies the data of image X1 as data that has been outputted at the point of the reaction timing.

When the data is specified as described above, the CPU 11 refers to the output information memory 13c to judge whether the specified data has been associated with "link destination" (Step A13). Then, when judged that the specific data has not been associated with "link destination" (NO at Step A13), the CPU 11 performs processing for re-outputting this specified data as it is (Step A15). Conversely, when judged that the specific data has been associated with "link destination" (YES at Step A13), the CPU 11 performs processing for jumping to this link destination (Step A14), and then performs processing for reading out detailed data (such as production description) from the link destination and newly outputting the detailed data (Step A15).

In this state, the CPU 11 judges whether an instructing operation by the customer (a touch operating on the touch screen) has been performed (Step A16). When judged that an instructing operation has not been performed (NO at Step A16), the CPU 11 proceeds to the next Step A18. Conversely, when judged that an instructing operation has been performed (YES at Step A16), the CPU 11 performs processing according to the instruction (Step A17), and then proceeds to Step A18. At Step A18, the CPU 11 judges whether a predetermined output time has elapsed, and then repeatedly returns to Step A15 until this output time elapses. When the output time elapses (YES at Step A18), the CPU 11 returns to the first Step A1 of FIG. 10 and, hereafter, repeatedly performs the above-described operations until power is turned OFF (Step A19).

As described above, in the digital signage apparatus 1 of the second embodiment, the timing of a viewer's (customer's) reaction while an advertisement is being outputted is detected as first timing (reaction timing), and predetermined timing later than this reaction timing is detected as second timing (output timing). Then, when the output timing is reached, data that has been outputted at the point of the reaction timing is specified, and output control regarding that data is performed. As a result of this configuration, the output of data attractive to a customer while pieces of data constituting an advertisement are sequentially outputted can be controlled appropriate timing. As a result, sudden data switching during advertisement output can be prevented, and the sequential flow of data can be kept. Consequently, the customer is prevented from overlooking or misidentifying data and the advertiser side (store side) can enhance the effect of the advertisement.

Also, the CPU 11 checks information in the output information memory 13c having stored therein output information associated with individual pieces of data constituting an advertisement against information in the reaction information memory 13d having stored therein the timing of a reaction (reaction timing) of a customer, and thereby specifies data that has been outputted at the point of the reaction timing. As a result of this configuration, data to which a customer has reacted can be easily specified from among outputted data.

Moreover, a reaction of a customer is recognized from a change in an image of the customer captured by the imaging section 19, and reaction timing is detected thereby. As a result of this configuration, a reaction of a customer can be accurately detected from a captured image without the customer being required to perform a special operation.

Furthermore, a reaction of a viewing customer is recognized from a change in the facial expression of the customer acquired by the analysis of a captured image of the customer. As a result of this configuration, a reaction of a customer can be further accurately detected.

Still further, a reaction of a customer is recognized from a voice inputted via the audio input/output section 17, and reaction timing is detected thereby. As a result of this configuration, a reaction of a customer can be accurately detected by a voice naturally coming from the customer, without the customer being required to perform a special operation.

Yet still further, timing when one cycle of the sequential output of pieces of data constituting an advertisement is completed (timing when output is changed from the last page to the head page) is detected as second timing (output timing). As a result of this configuration, sudden data switching during advertisement output is prevented, and the customer can view data attractive to the customer after viewing a series of data.

Yet still further, data that has been outputted at the point of reaction timing is again outputted at output timing. As a result of this configuration, a customer can check interesting data again.

Yet still further, when data that has been outputted at the point of reaction timing is associated with link data, this link data is newly acquired and outputted. As a result of this configuration, when a customer reacts to a product, the current output is switched to the output of link data such as detailed descriptions of the product.

Yet still further, when a customer performs an instructing operation with output control being performed for data that has been outputted at the point of reaction timing, processing according to this instructing operation is performed. As a result of this configuration, a purchase order on a product purchase screen can be placed on the spot.

In the above-described second embodiment, a reaction of a viewing customer is recognized from a change in an image of the customer captured by the imaging section 19, and reaction timing is detected thereby. Also, a reaction of a viewing customer is recognized from an inputted voice, and reaction timing is detected thereby. However, a configuration may be adopted in which reaction timing is detected by a predetermined input operation by a customer. In this case, for example, a configuration may be adopted in which, when a customer who is interested in an advertisement unintentionally touches the advertisement screen (touch screen) or purposefully operates a predetermined touch key or push button in order to input an instruction, the time when the customer has touched the screen or operated the key or button is detected as reaction timing. By input operations such as this, reaction timing can be detected.

Also, in the above-described second embodiment, timing when one cycle of the sequential output of pieces of data constituting an advertisement is completed is detected as second timing (output timing). However, a configuration may be adopted in which timing when one cycle of the sequential output of data is completed after the detection of a customer near the advertisement screen is started is detected as second timing (output timing). In this case, for example, a configuration may be adopted in which data when a customer starts viewing an advertisement is taken as a starting point, and timing when one cycle of the sequential output of data is completed from the starting point is taken as output timing. In this configuration, an image captured by the imaging section 19 is analyzed, and the time when the face of the customer is directed at the advertisement screen is recognized as the time when the advertisement is started to be viewed. Note that a configuration may be adopted in which, after the data of an advertisement started to be viewed by a customer is outputted again, data that has been outputted at the point of reaction timing is outputted.

In the above-described configuration where timing when one cycle of the sequential output of data is completed after the start of the viewing of the advertisement is taken as output timing, the flowchart of FIG. 10 is partially changed. For example, when a judgment is made at Step A2 of FIG. 10 that a person has been detected, the face of the customer is imaged, the captured image is analyzed to judge whether the face is starting to be directed at the advertisement screen, and the identification information of data that has been outputted at the start of this movement is temporarily stored. At Step A4 of FIG. 10, this data is taken as a starting point, and whether one cycle of sequential output of data has been completed is judged.

By this configuration where the timing, at which one cycle is completed with the data of an advertisement started to be viewed as a starting point, is detected as output timing, the customer can view the interesting data after viewing the entire data.

Also, in the above-described second embodiment, timing when one cycle of the sequential output of data is completed is detected as output timing. However, timing when the state of a customer is changed from a state where an advertisement output can be viewed to a state where the advertisement output cannot be viewed is detected as output timing. In this configuration, for example, timing when the customer is about to go away from the digital signage apparatus 1 may be detected as output timing. Alternatively, timing when the customer has widely looked away such that the eyes are directed to the outside of the advertisement screen may be detected as output timing. In this case, for example, an image captured by the imaging section 19 is analyzed, and timing when the customer is about to go away or timing when the customer has widely looked away is detected based on the direction of the face or eyes of the customer.

By this configuration where timing when a customer is about go away or timing when the customer has looked away is taken as output timing, the customer's attention is paid to the advertisement again.

Moreover, a configuration may be adopted in which timing when a customer is about to exit toward the outside of a store is taken as output timing for outputting data to which the customer has reacted. For example, a configuration may be adopted in which the data of a product attractive to a customer viewing a digital signage apparatus installed near the entrance of a store is transmitted to a digital signage apparatus installed near the exit of the store for output. In this case, a communication system in the store tracks and manages the identification information and the position of the customer by communicating with a portable terminal device of the customer. Then, when it is recognized that the customer is about to pass through an area near the exit of the store, the communication system transmits the data of the product attractive to the customer to the digital signage apparatus near the exit, and instructs the apparatus to output the data.

Note that, although not particularly mentioned in the second embodiment, the present invention can be similarly applied in a case where a plurality of viewers are present near the digital signage apparatus. In this case, when it is detected that a plurality of viewers are present, reaction timing is detected for each viewer, and output control on data that has been outputted at the point of each reaction timing is repeatedly performed for each viewer.

That is, when a plurality of viewers are detected to be present near the digital signage apparatus by the human sensor section 16, the CPU 11 detects the timing of reaction for each viewer, as first timing. Here, a plurality of first timings are detected. Accordingly, the number of viewers is counted, and first timings as many as the number of viewers are detected. Next, the CPU 11 specifies data that has been outputted at the point of the first timing for each viewer (for example, specifies pieces of data as many as the number of viewers), and repeatedly performs output control on the data for each viewer.

Here, the data to which each viewer has reacted may be, for example, sequentially switched and displayed at output timing or sequentially switched and displayed by a page turning operation (touch operation) on the advertisement screen (touch screen). When the number of viewers detected is three but the number of viewers who has reacted to the advertisement is two, first timings may be detected only for the two viewers. Also, the present embodiment is not limited to this configuration where the number of viewers is counted, and a configuration may be adopted in which a viewer is specified by the positions (such as the right corner or center) of customers with respect to the digital signage apparatus being detected, and data is specified which has been outputted at the point of the reaction timing of the viewer.

Third Embodiment

Figure 13:
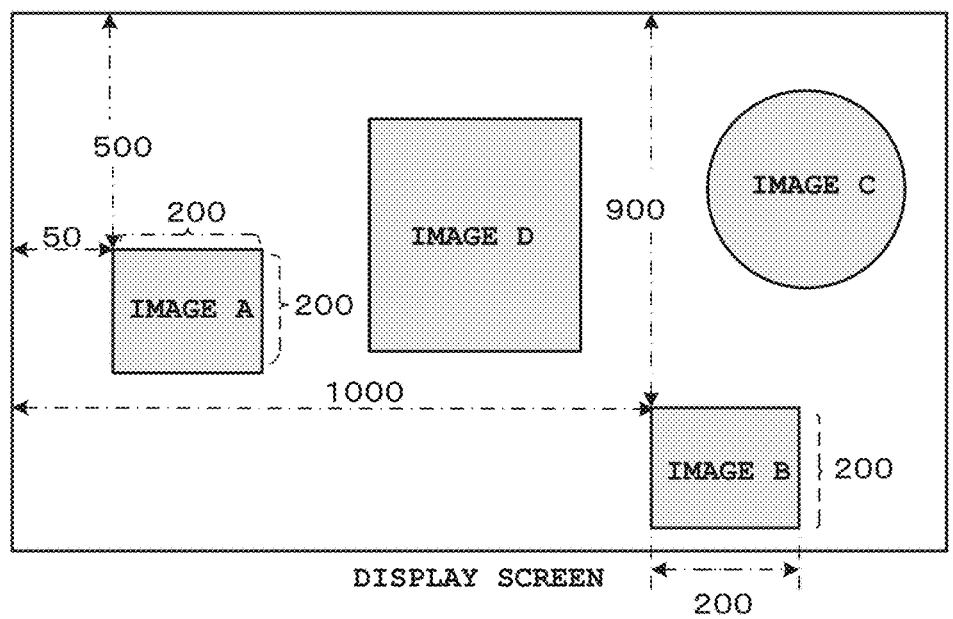
FIG. 13A is a diagram showing an example of the display of advertisement data.
FIG. 13B is a diagram for describing the output information memory 13c.
FIG. 13C is a diagram for describing the reaction information memory 13d.

A third embodiment of the present invention is described below with reference to FIG. 13 to FIG. 15.

In the above-described second embodiment, timing when a customer has reacted to an advertisement is detected. However, in the third embodiment, a display position (advertisement position) on the advertisement screen at which a customer is staring is detected. Then, at predetermined timing (output timing) after data on this position being stared is specified, output control on the data is performed. Also, in the second embodiment, pieces of data constituting an advertisement are sequentially outputted. However, in the third embodiment, advertisement data for one screen is always outputted, and timing when a customer goes away from the advertisement screen is taken as output timing. Note that sections that are basically the same or have the same name in both embodiments are given the same reference numerals, and therefore explanations thereof are omitted. Hereafter, the characteristic portion of the third embodiment will mainly be described.

FIG. 13A depicts a state where image A, image B, image C, and image D have been arranged and displayed on the advertisement screen as data for one screen. That is, plural pieces of data have been arranged and displayed on one screen. FIG. 13B is a diagram showing details of the output information memory 13c in this embodiment.

The output information memory 13c of the third embodiment has fields of "data number", "data name", "data size", "data attachment position", and "link destination".

"Data number", "data name", and "link destination" are similar to those of FIG. 3 described above, and "data size" indicates the size (lateral width and vertical width) of data on the advertisement screen. As shown in FIG. 13A, image A has a size of 200×200 dots, and image B has a size of 200×100 dots. "Data attachment position" indicates a position of the upper-left corner of data serving as an attachment position (display position) in a plane-coordinate system where the upper-left corner of the advertisement screen is the origin. The attachment position of image A has an X coordinate value of 50 dots and a Y coordinate value of 500 dots, and the attachment position of image B has an X coordinate value of 1000 dots and a Y coordinate value of 900 dots, as shown in FIG. 13A.

FIG. 13C is a diagram for describing the reaction information memory 13d.

The reaction information memory 13d of the third embodiment has fields of "data number" and "staring data identification information". "Staring data identification information" indicates identification information (data name) of data displayed at a position on the advertisement screen at which a customer is staring. The CPU 11 analyzes an image captured by the imaging section 19 and, when a customer is staring at one point without changing the sight line direction for more than a predetermined period of time, detects a display position (advertisement position) at which the customer is staring as a staring position, based on the sight line direction. The staring position is detected not only by dot but also by ten dots. Also, an approximate position (area) may be detected by area by the advertisement screen being divided into a plurality of area. In the shown example, the customer is staring at image A on the advertisement screen.

Figure 14:
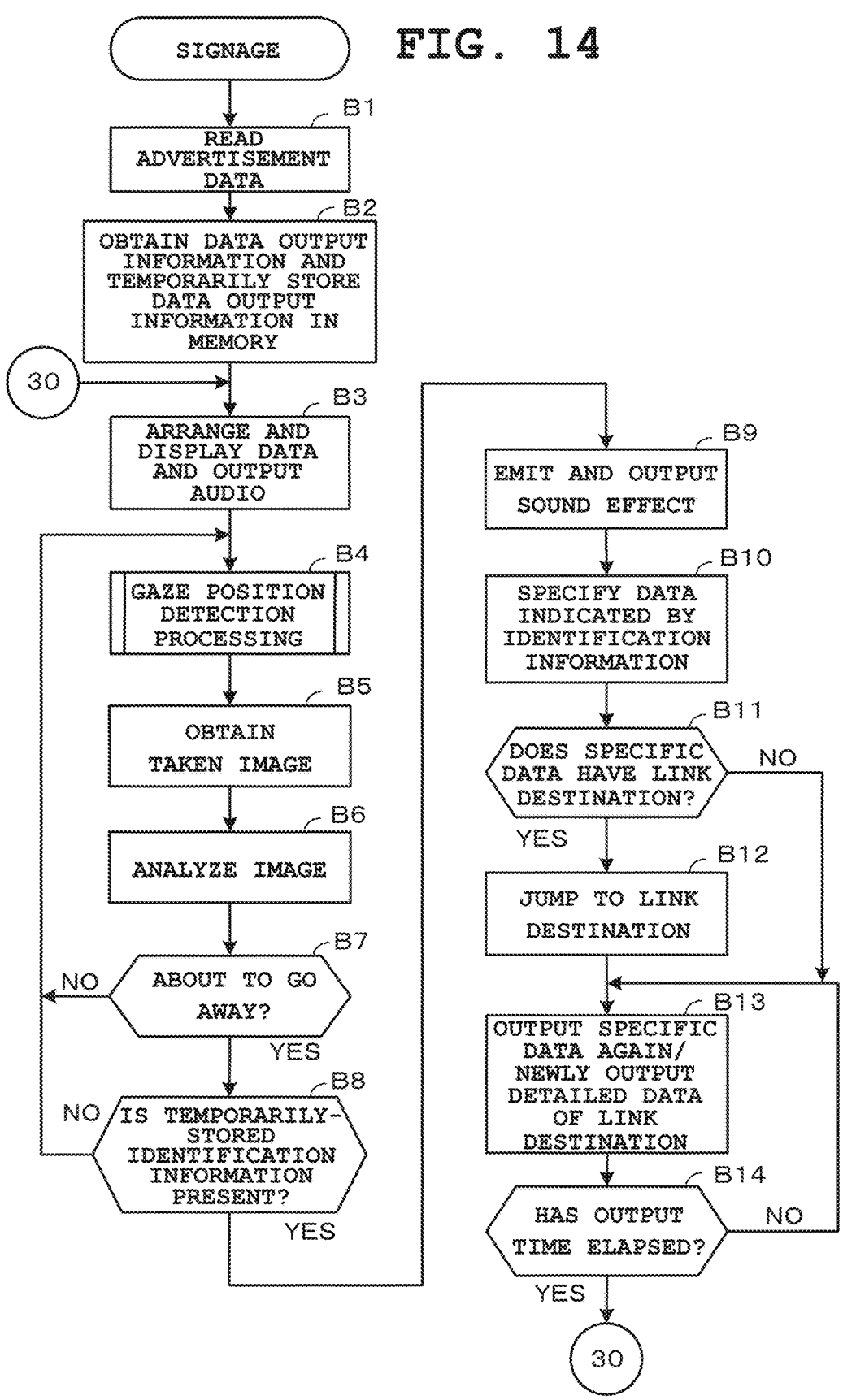
FIG. 14 is a flowchart for describing an operation (a characteristic operation of a third embodiment) of the digital signage apparatus 1 which is started upon power up.

FIG. 14 is a flowchart for describing an operation (a characteristic operation of the third embodiment) of the digital signage apparatus 1 which is started upon power up.

First, when advertisement data is readout (Step B1), the CPU 11 generates "data name", "data size", "data attachment position", and "link destination" as the output information of the advertisement data, and causes the output information memory 13c to temporarily store the output information (Step B2). In addition, the CPU 11 causes the advertisement data to be arranged and displayed on the advertisement screen and performs audio output (Step B3). Then, the CPU 11 proceeds to staring position detection processing (Step B4).

Figure 15:
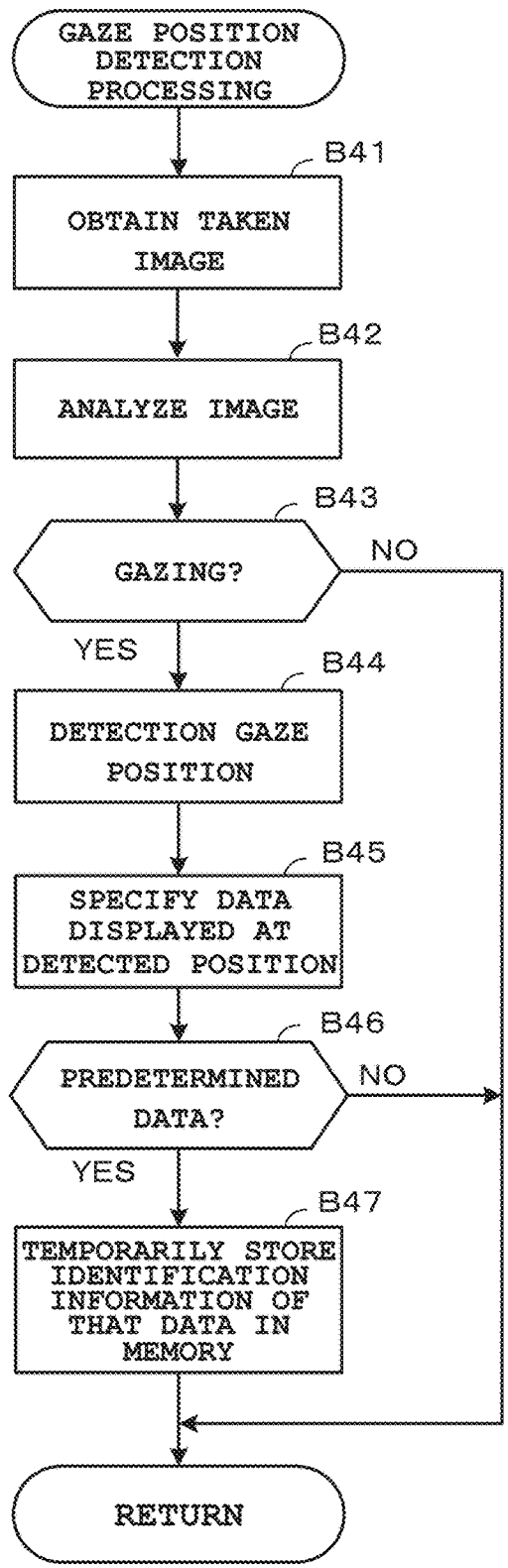
FIG. 15 is a flowchart for describing stare detection processing (Step B4 of FIG. 14) in detail.

FIG. 15 is a flowchart for describing the staring position detection processing (Step B4 of FIG. 14) in detail.

First, the CPU 11 acquires an image captured by the imaging section 19 (Step B41). Subsequently, the face recognition section 20 analyzes this captured image (Step B42), whereby the CPU 11 judges whether a customer is staring at one point without changing the sight line direction for more than a predetermined time (for example, two seconds) (Step B43).

When judged that no customer is staring at the advertisement screen (NO at Step B43), the CPU 11 exits the flow of FIG. 15. Conversely, when judged that a customer is staring at the advertisement screen (YES at Step B43), the CPU 11 proceeds to processing for detecting a position being stared (advertisement position) on the advertisement screen (Step B44). In this embodiment, an approximate position (area) is detected by ten dots or detected by area by the advertisement screen being divided into a plurality of areas. Then, the CPU 11 refers to "data size" and "data attachment position" of the output information memory 13c to specify data that has been displayed at the staring position (Step B45), and judges whether this specified data is predetermined data (for example the data of a product name or product price) (Step B46). Here, when the specified data is not predetermined data, such as the data of a background image unrelated to the advertisement-target product (NO at Step B46), the CPU 11 exits the flow of FIG. 15. Conversely, when the specified data is predetermined data (YES at Step B46), the CPU 11 performs processing for temporarily storing the identification information (data name) of the data in the reaction information memory 13d, as "staring data identification information" (Step B47), and then exits the flow of FIG. 15.

When the above-described staring position detection processing (Step B4 of FIG. 14) is completed, the CPU 11 acquires an image captured by the imaging section 19 (Step B5), analyzes the captured image (Step B6), and judges whether the state of the customer has been changed from a state where advertisement output can be viewed to a state where advertisement output cannot be viewed, or in other words, judges whether the customer is about to go away, by detecting the orientation of the face or the sight line direction of the customer (Step B7). Here, when judged that the customer is not about to go away, or in other words, the customer is continuously looking at the advertisement screen (NO at Step B6) the CPU 11 returns to the staring position detection processing (Step B4). Conversely, when judged that the customer is about to go away (YES at Step B6), the CPU 11 judges whether "staring data identification information" has been temporarily stored in the reaction information memory 13d, or in other words, judges whether this is a case where a customer who has reacted to the advertisement is about to go away (Step B8).

Then, when judged that this is a case where a customer who has not reacted to the advertisement is about to go away, since "staring data identification information" has not been stored (NO at Step B8), the CPU 11 returns to the staring position detection processing (Step B4). Conversely, when judged that this is a case where a customer who has reacted to the advertisement is about to go away, since "staring data identification information" has been temporarily stored in the reaction information memory 13d (YES at Step B8), the CPU 11 causes a sound effect (such as a loud sound or a voice sound for calling the customer to stop) to be emitted and outputted to attract the attention of the customer (Step B9). Then, the CPU 11 refers to the output information memory 13c based on "staring data identification information" to specify data (Step B10), and judges whether the specified data has been associated with "link destination" (Step B11).

Then, when judged that the specified data has not been associated with "link destination" (NO at Step B11), the CPU 11 performs processing for re-outputting the specified data (Step B13). Conversely, when judged that the specified data has been associated with "link destination" (YES at Step B11), the CPU 11 performs processing for jumping to this link destination (Step B12), and then performs processing for newly outputting detailed data of the link destination (Step B13). In this state, the CPU 11 judges whether a predetermined output time has elapsed (Step B14), and repeatedly returns to Step B13 until this output time elapses. Then, when the lapse of the output time is detected (YES at Step B14), the CPU 11 returns to the above-described Step B3.

As described above, the digital signage apparatus 1 of the third embodiment detects a position being stared by a viewer (customer) on the advertisement screen in advertisement display. Then, when predetermined data is being shown at the staring position, the digital signage apparatus 1 temporarily stores identification information for specifying the predetermined data, and after specifying the predetermined data that has been displayed at the staring position from the temporarily-stored identification information at predetermined subsequent timing, performs output control for this data. As a result of this configuration, the output of data attractive to a customer can be controlled at appropriate timing without the customer being required to perform a special operation. In addition, data attractive to a customer can be accurately specified, whereby the advertiser side (store side) can enhance advertisement effects.

In the example of the above-described third embodiment, advertisement data for one screen is always outputted. However, pieces of data constituting an advertisement may be sequentially outputted, as with the first embodiment. Also, in the third embodiment, a position being stared by a viewer (customer) on the advertisement screen in advertisement display is detected. However, the position to be detected is not limited to the position being stared. For example, a configuration may be adopted in which, when a customer touches an arbitrary position on the touch screen, a position specified by this input operation is detected. Also, a configuration may be adopted in which, when a facial expression is changed, such as when the pupils of a customer's eyes are wide open (when the customer is surprised) or the mouth of a customer is open (when the customer is smiling) for more than a predetermined period of time, a display position at which the customer is looking is taken as a position arbitrarily specified by the customer.

Also, in the third embodiment, timing when a customer is about to go away from the advertisement screen is taken as output timing. However, timing when one cycle of the sequential output of pieces of data constituting an advertisement is completed (timing when output is changed from the last page to the head page) may be detected as output timing, as with the first embodiment. Also, a configuration may be adopted in which data when a customer starts viewing an advertisement is taken as a starting point, and timing when one cycle of the sequential output of data is completed from the starting point is taken as output timing. Moreover, a configuration may be adopted in which timing when a customer is about to go away to the outside of a store is detected as output timing. By the configuration where pieces of data constituting an advertisement are sequentially outputted, effects similar to those of the second embodiment can be achieved.

Furthermore, a configuration may be adopted in which, at timing when a customer who has reacted to data (product) at an area near the entrance of a store is about to pass through a section where the product is available, the data of the product is displayed on a digital signage apparatus installed at this section. This configuration can be achieved by customer identification information and the position of the customer being tracked and managed by communication with a portable terminal device of the customer being made in a store.

In the above-described second and third embodiments, a face image of a viewer (customer) is analyzed and whereby the sight line direction or the like is detected as a reaction of the viewer. However, a configuration may be adopted in which a gesture of a viewer is detected as a reaction of the viewer. Also, the voice of a customer in the above-described embodiments is not limited to voice naturally coming from the customer in reaction to advertisement contents, and a configuration may be adopted in which voice for inputting an instruction is detected.

Also, in the examples of the second and third embodiments, the digital signage apparatus has been installed in a store. However, the present invention is not limited thereto and the digital signage apparatus may be installed in a station or on the street.

Moreover, the advertisement screen in the above-described embodiments is a touch screen. However, in a case where the digital signage apparatus includes a projector, a configuration may be adopted in which a projected image is displayed on a screen.

While the present invention has been described with reference to the preferred embodiments, it is intended that the invention be not limited by any of the details of the description therein but includes all the embodiments which fall within the scope of the appended claims.

What is claimed is:

1. A content output device comprising:
   a first memory; and
   a processor which executes a stored program to perform processes comprising:
      outputting output details of content while sequentially changing the output details;
      detecting, in response to an instruction being given by a user at an arbitrary timing while the output details of the content are being sequentially changed and outputted, an instruction timing of the instruction;
      controlling to store the detected instruction timing in the first memory in association with the content;
      judging whether the instruction timing has been stored in the first memory at a predetermined timing after a series of outputs of the output details of the content is completed;
      specifying the output detail of the content that was outputted at a point of the instruction timing which is stored in the first memory, in response to a judgement that the instruction timing has been stored in the first memory at the predetermined timing; and
      performing processing corresponding to the specified output detail,
   wherein the output details of the content each include link information associated therewith, and
   wherein the processing corresponding to the specified output detail is a process of outputting information of a link destination based on the link information associated with the specified output detail.

2. The content output device according to claim 1, wherein the output details of the content include information for each of a plurality of positions and, when the instruction is given by the user at the instruction timing by specifying an arbitrary position in the output details of the content being sequentially changed and outputted, the processor detects the instruction timing and the specified position, and
   wherein the processor specifies information corresponding to the specified position in the output detail of the content that has been outputted at the point of the instruction timing by searching information stored in a content storage section.

3. A content output apparatus for outputting content, comprising:
   an output control section which outputs output details in the content while sequentially changing the output details;
   a content storage section which stores each of the output details of the content in association with each output timing;
   a detection control section which judges whether a reaction at an arbitrary timing has been made by a user while the output details of the content are being sequentially changed and outputted, and which detects a reaction timing of the reaction when the reaction is judged to have been made;
   a storage control section which causes the detected reaction timing to be stored in a reaction storage section in association with the content;

a specification control section which judges whether the reaction timing has been stored in the reaction storage section at a predetermined timing after a series of outputs of the output details of the content is completed, reads out the reaction timing stored in the reaction storage section when the reaction timing is judged to have been stored, and specifies an output detail of the content that was outputted at a point of the reaction timing; and a processing execution control section which performs processing corresponding to the specified output detail, wherein the detection control section judges, when the user is judged to be near a location where the output details are being outputted, a specific voice based on analysis of a voice of the user or a change in a captured image of the user based on analysis of the captured image, and detects a judgment timing as the reaction timing.

4. The content output apparatus according to claim 3, wherein the specification control section judges whether the reaction timing has been stored in the reaction storage section after the series of outputs of the content is completed, and specifies the output detail of the content when the reaction timing is judged to have been detected.

5. The content output apparatus according to claim 3, wherein the output details of the content each include link information associated therewith, and wherein the processing execution control section performs processing for outputting information of a link destination based on the link information associated with the output detail specified by the specification control section.

6. The content output apparatus according to claim 3, further comprising:

a judgment control section which judges whether link information has been included in association with the output detail specified by the specification control section, wherein the processing execution control section outputs information of a link destination based on the link information when the link information is judged to have been included, or performs processing for outputting the output detail specified by the specification control section when the link information is judged to have not been included.

7. A method of controlling a content output device, the method comprising:

outputting output details of content while sequentially changing the output details;

detecting, in response to an instruction being given by a user at an arbitrary timing while the output details of the content are being sequentially changed and outputted, an instruction timing of the instruction;

controlling to store the detected instruction timing to be stored in a first memory in association with the content;

judging whether the instruction timing has been stored in the first memory at a predetermined timing after a series of outputs of the output details of the content is completed;

specifying the output detail of the content that was outputted at a point of the instruction timing which is stored in the first memory, in response to a judgement that the instruction timing has been stored in the first memory at the predetermined timing; and performing processing corresponding to the specified output detail, wherein the output details of the content each include link information associated therewith, and wherein the processing corresponding to the specified output detail is a process of outputting information of a link destination based on the link information associated with the specified output detail.

8. A method of controlling a content output apparatus for outputting content, the method comprising:

outputting output details in the content while sequentially changing the output details;

storing each of the output details of the content in a content storage section in association with each output timing;

judging whether a reaction at an arbitrary timing has been made by a user while the output details of the content are being sequentially changed and outputted, and detecting a reaction timing of the reaction when the reaction is judged to have been made;

causing the detected reaction timing to be stored in a reaction storage section in association with the content;

judging whether the reaction timing has been stored in the reaction storage section at a predetermined timing after a series of outputs of the output details of the content is completed, reading out the reaction timing stored in the reaction storage section when the reaction timing is judged to have been stored, and specifying an output detail of the content that was outputted at point of the reaction timing; and performing processing corresponding to the specified output detail, wherein the output details of the content each include link information associated therewith, and wherein the processing corresponding to the specified output detail is a process of outputting information of a link destination based on the link information associated with the specified output detail.

9. The content output device according to claim 1, further comprising a second memory which stores each of the output details of the content in association with each output timing.

* * * * *